United States Patent
Bang et al.

(10) Patent No.: US 10,791,545 B2
(45) Date of Patent: Sep. 29, 2020

(54) METHOD FOR TRANSMITTING FRAME ON BASIS OF MULTIPLE CHANNELIZED CHANNELS IN WIRELESS LAN SYSTEM, AND WIRELESS TERMINAL USING SAME

(71) Applicant: LG ELECTRONICS INC., Seoul (KR)

(72) Inventors: Saehee Bang, Seoul (KR); Jinsoo Choi, Seoul (KR); Jinmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/326,178

(22) PCT Filed: Jul. 4, 2018

(86) PCT No.: PCT/KR2018/007536
§ 371 (c)(1),
(2) Date: Feb. 15, 2019

(87) PCT Pub. No.: WO2019/009596
PCT Pub. Date: Jan. 10, 2019

(65) Prior Publication Data
US 2019/0191414 A1  Jun. 20, 2019

Related U.S. Application Data

(60) Provisional application No. 62/554,029, filed on Sep. 5, 2017, provisional application No. 62/552,397, filed (Continued)

(51) Int. Cl.
*H04W 72/04*   (2009.01)
*H04W 84/12*   (2009.01)
*H04L 5/00*    (2006.01)

(52) U.S. Cl.
CPC ............... *H04W 72/04* (2013.01); *H04L 5/00* (2013.01); *H04W 84/12* (2013.01)

(58) Field of Classification Search
CPC ... H04B 7/0617; H04B 7/0695; H04W 16/28; H04W 24/10; H04W 28/06;
(Continued)

(56) References Cited

U.S. PATENT DOCUMENTS 9,992,741 B2 * 6/2018 Trainin ............. H04W 52/0216
10,244,531 B2 * 3/2019 Eitan ................. H04W 72/0453
(Continued)

FOREIGN PATENT DOCUMENTS

EP        3566524        11/2019
WO   WO-2019009596 A1 *  1/2019  ............ H04W 84/12
WO   WO-2019009669 A1 *  1/2019

OTHER PUBLICATIONS

Maltsev et al., Channel Models for IEEE 802.11ay, May 2016, IEEE, doc.: IEEE 802.11-15/1150r8 (Year: 2016).*
(Continued)

*Primary Examiner* — Eric Nowlin
(74) *Attorney, Agent, or Firm* — Lee Hong Degerman Kang Waimey

(57) ABSTRACT

A method for transmitting a frame on the basis of multiple channelized channels in a wireless LAN system according to one embodiment of the present specification comprises the steps of: configuring, by a first wireless terminal, a control mode physical protocol data unit (PPDU) including encoding information on a channel bandwidth formed on the basis of first to sixth channels sequentially arranged on the frequency axis, wherein five bits are assigned for the encoding information and each of the first to sixth channels has a bandwidth of 2.16 GHz; and transmitting, by the first
(Continued)

wireless terminal, the control mode PPDU to a second wireless terminal on the basis of the channel bandwidth.

12 Claims, 11 Drawing Sheets

Related U.S. Application Data on Aug. 31, 2017, provisional application No. 62/544,920, filed on Aug. 14, 2017, provisional application No. 62/544,927, filed on Aug. 14, 2017, provisional application No. 62/539,558, filed on Aug. 1, 2017, provisional application No. 62/534,695, filed on Jul. 20, 2017, provisional application No. 62/530,155, filed on Jul. 8, 2017, provisional application No. 62/528,971, filed on Jul. 6, 2017, provisional application No. 62/528,981, filed on Jul. 6, 2017.

(58) Field of Classification Search
CPC . H04W 40/244; H04W 72/04; H04W 72/046; H04W 74/002; H04W 84/12
See application file for complete search history.

(56) References Cited

U.S. PATENT DOCUMENTS

| | | | |
|---|---|---|---|
| 2016/0249332 A1 | 8/2016 | Xin et al. | |
| 2017/0048844 A1 | 2/2017 | Chen et al. | |
| 2017/0070995 A1* | 3/2017 | Eitan | H04W 72/0453 |
| 2017/0332277 A1* | 11/2017 | Xin | H04W 28/06 |
| 2017/0367099 A1* | 12/2017 | Cariou | H04W 16/14 |
| 2018/0183908 A1* | 6/2018 | Trainin | H04L 69/324 |
| 2018/0242299 A1* | 8/2018 | Xin | H04L 5/0092 |
| 2018/0324695 A1* | 11/2018 | Trainin | H04W 52/0216 |
| 2019/0052395 A1* | 2/2019 | Motozuka | H04L 1/0003 |
| 2019/0068258 A1* | 2/2019 | Oteri | H04B 7/0617 |
| 2019/0174328 A1* | 6/2019 | Park | H04W 72/04 |
| 2019/0191414 A1* | 6/2019 | Bang | H04W 84/12 |
| 2019/0200388 A1* | 6/2019 | Park | H04W 72/12 |
| 2019/0208463 A1* | 7/2019 | Lou | H04B 7/0413 |

OTHER PUBLICATIONS

Trainin et al., EDMG dynamic channel BW signalling, Sep. 11, 2016, IEEE, doc.: IEEE 802.11-16/1206r0 (Year: 2016).*
Sakamoto, Comment Resolution on transmission bandwidth of EDMG A-PPDU, Jul. 11, 2017, IEEE, doc.: IEEE 802.11-yy/xxxxr0 (Year: 2017).*
PCT International Application No. PCT/KR2018/007536, International Search Report dated Sep. 28, 2018, 4 pages.
Xing, W. et al., "Duplicated Control Mode PPDU for 802.11ay", doc.: IEEE 802.11-16/1146r1, Sep. 2016, 12 pages.
Cariou, L. et al., "Bandwidth signaling for EDMG", doc.: IEEE 802.11-16/0954r0, Jul. 2016, 22 pages.
Da Silva, C. et al., "Header—A Definition for EDMG Control Mode", doc.: IEEE 802.11-17/0052r1, Jan. 2017, 10 pages.
IEEE Computer Society, "Part 11: Wireless LAN Medium Access Control (MAC) and Physical Layer (PHY) Specifications," Section 19.3.15 of IEEE P802.11-REVmc/D8.0, Aug. 2016, 4 pages.
IEEE Computer Society, "Part 11: Wireless LAN Medium Access Control (MAC) and Physical Layer (PHY) Specifications; Amendment 3: Enhancements for Very High Throughput in the 60 GHz Band," Section 21.3.1 to Section 21.3.2 of IEEE Std 802.11ad, Dec. 2012, 4 pages.
IEEE Computer Society, "Part 11: Wireless LAN Medium Access Control (MAC) and Physical Layer (PHY) Specifications; Amendment 3: Enhancements for Very High Throughput in the 60GHz Band," Annex E of IEEE Std 802.11ad, Dec. 2012, 5 pages.
European Patent Office Application Serial No. 18827526.7, Search Report dated Apr. 2, 2020, 9 pages.
ZTE Corporation, "Duplicated Control Mode PPDU for 802.11ay", IEEE 802.11-16/1146r0, Sep. 2016, 11 pages.

* cited by examiner (A)

(B)

METHOD FOR TRANSMITTING FRAME ON BASIS OF MULTIPLE CHANNELIZED CHANNELS IN WIRELESS LAN SYSTEM, AND WIRELESS TERMINAL USING SAME

CROSS-REFERENCE TO RELATED APPLICATIONS

This application is the National Stage filing under 35 U.S.C. 371 of International Application No. PCT/KR2018/007536, filed on Jul. 4, 2018, which claims the benefit of U.S. Provisional Application No. 62/528,981, filed on Jul. 6, 2017, 62/528,971, filed on Jul. 6, 2017, 62/530,155, filed on Jul. 8, 2017, 62/534,695, filed on Jul. 20, 2017, 62/539,558, filed on Aug. 1, 2017, 62/544,927, filed on Aug. 14, 2017, 62/544,920, filed on Aug. 14, 2017, 62/552,397, filed on Aug. 31, 2017, and 62/554,029, filed on Sep. 5, 2017, the contents of which are all hereby incorporated by reference herein in their entireties.

BACKGROUND OF THE INVENTION

Field of the Invention

The present specification relates to wireless communication and, more particularly, to a method for transmitting a frame based on a plurality of channelized channels in a wireless local area network system and a wireless terminal using the same.

Related Art

Institute of Electrical and Electronics Engineers (IEEE) 802.11ad standard is ultra-high speed wireless communication standard operating in a band higher than 60 GHz. The coverage of a signal is about 10 meters, and meanwhile, throughput of more than 6 GHz is supportable. Since it operates high frequency band, signal propagation is dominated by ray-like propagation. As a transmitted (TX) or received (RX) antenna beam is aligned toward a strong spatial signal path, a signal quality can be improved.

IEEE 802.11ad standard provides beamforming training procedure for antenna beam alignment. IEEE 802.11ay is next generation standard which is being developed in a target of throughput of 20 Gbps or more based on IEEE 802.11ad standard.

SUMMARY OF THE INVENTION

An aspect of the present specification is to provide a method for transmitting a frame based on a plurality of channelized channels in a wireless local area network (WLAN) system with improved performance and a wireless terminal using the same.

A method for transmitting a frame based on a plurality of channelized channels in a WLAN system according to one embodiment of the present specification includes: configuring, by a first wireless terminal, a control mode physical protocol data unit (PPDU) including encoding information on a channel bandwidth for a formed channel based on first to sixth channels sequentially arranged on a frequency domain, five bits being allocated for the encoding information and each of the first to sixth channels having a bandwidth of 2.16 GHz; and transmitting, by the first wireless terminal, the control mode PPDU to a second wireless terminal based on the channel bandwidth.

According to one embodiment of the present specification, there are provided a method for transmitting a frame based on a plurality of channelized channels in a WLAN system with improved performance and a wireless terminal using the same.

DESCRIPTION OF EXEMPLARY EMBODIMENTS

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also include complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

Figure 1:
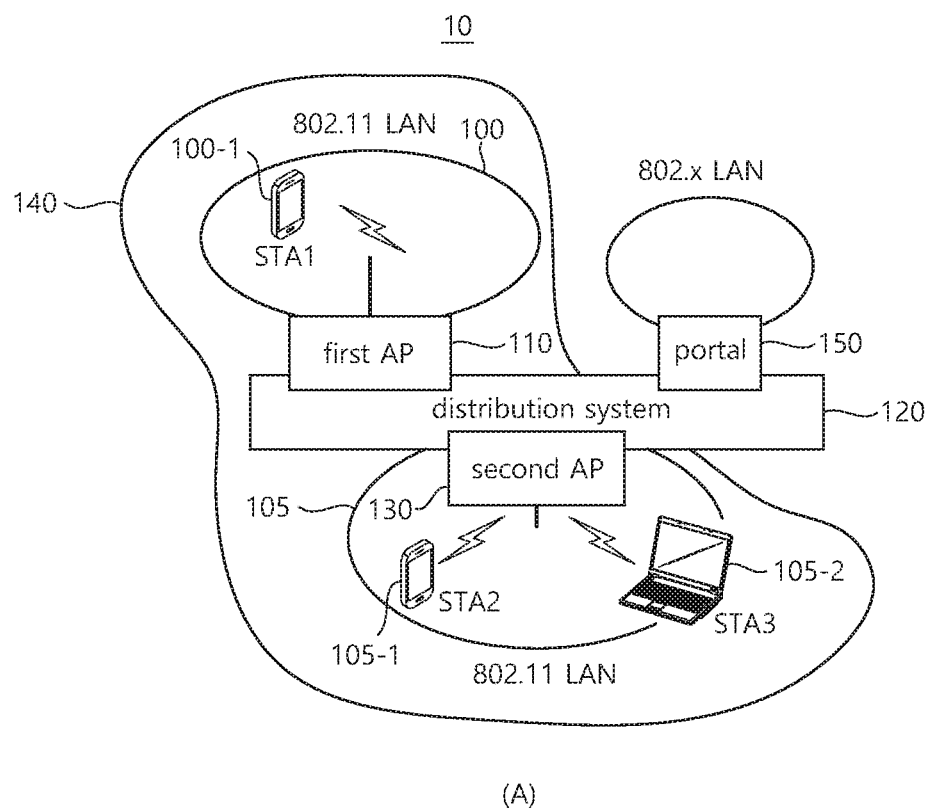
FIG. 1 is a conceptual view illustrating the structure of a wireless local area network (WLAN) system.
Figure 1:
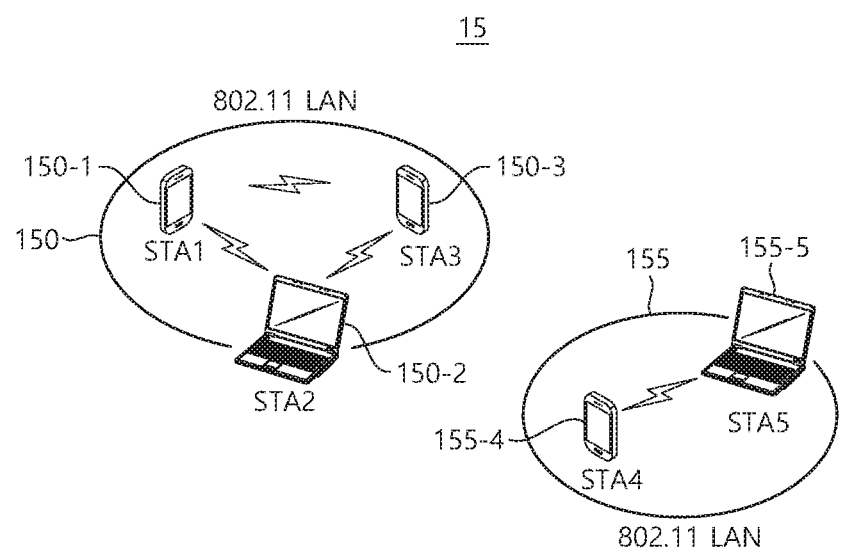

FIG. 1 is a conceptual view illustrating the structure of a wireless local area network. FIG. 1A illustrates the structure of an infrastructure basic service set (BSS) of institute of electrical and electronic engineers (IEEE) 802.11.

Referring the FIG. 1A, the WLAN system 10 of the FIG. 1A may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, The BSS 100 may include one AP 110 and one or more STAs 100-1 which may be related with one AP 110. The BSS 105 may include one or more STAs 105-1 and 105-2 which may be related with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1A, a network between the APs 110 and 130 and a network between the APs 110 and 130 and the STAs 100-1, 105-1, and 105-2 may be implemented.

FIG. 1B illustrates a conceptual view illustrating the IBSS. Referring to FIG. 1B, a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1B, the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner.

In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
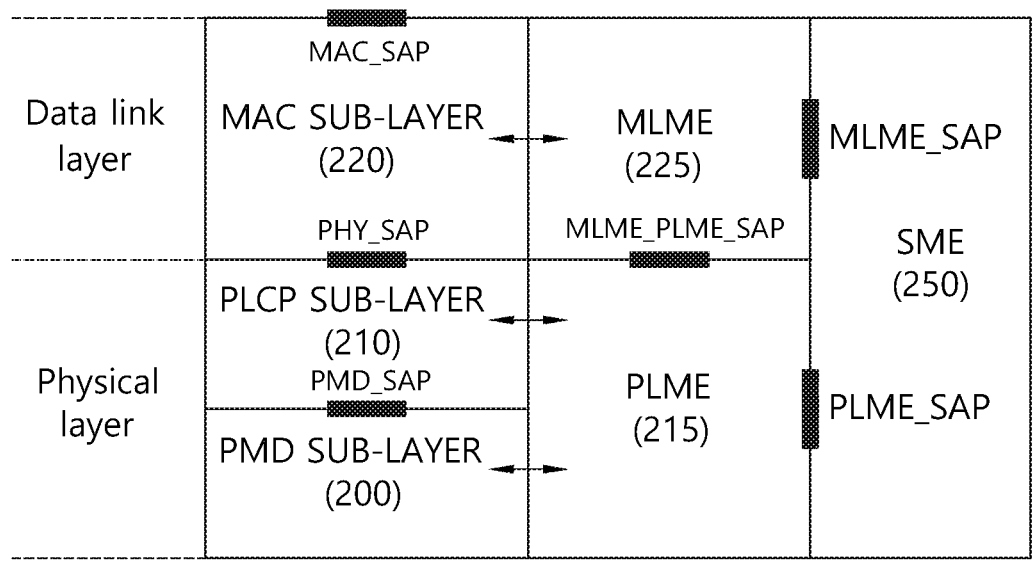
FIG. 2 is a conceptual view illustrating a layered architecture of a WLAN system supported by IEEE 802.11.

FIG. 2 is a conceptual view illustrating a layered architecture of a WLAN system supported by IEEE 802.11.

Referring to FIG. 2, the layered architecture of the WLAN system may include a physical medium dependent (PMD) sub-layer 200, a physical layer convergence procedure (PLCP) sub-layer 210, and a medium access control (MAC) sub-layer 220.

The PLCP sub-layer 200 may serve as a transmission interface for transmitting/receiving data between a plurality of STAs. The PLCP sub-layer 210 is implemented such that the MAC sub-layer 220 is operated with a minimum dependency with respect to the PMD sub-layer 200.

The PMD sub-layer 200, the PLCP sub-layer 210, and the MAC sub-layer 220 may conceptually include respective management entities. For example, the management entity of the MAC sub-layer 220 is referred to as a MAC layer management entity (MLME) 225. The management entity of the physical layer is referred to as a PHY layer management entity (PLME) 215.

The management entities may provide an interface for performing a layer management operation. For example, the PLME 215 may be connected to the MLME 225 to perform a management operation of the PLCP sub-layer 210 and the PMD sub-layer 200. The MLME 225 may be connected to the PLME 215 to perform a management operation of the MAC sub-layer 220.

An STA management entity (SME) 250 may exist to perform a proper MAC layer operation. The SME 250 may be operated as a constitutional element independent of each layer. The PLME 215, the MLME 225, and the SME 250 may mutually transmit and receive information based on a primitive.

The operation of each sub-layer is briefly described as follows. For example, the PLCP sub-layer 210 delivers a MAC protocol data unit (MPDU) received from the MAC sub-layer 220 according to an instruction of the MAC layer between the MAC sub-layer 220 and the PMD sub-layer 200 to the PMD sub-layer 200 or delivers a frame from the PMD sub-layer 200 to the MAC sub-layer 220.

The PMD sub-layer 200 is a PLCP sub-layer and may transmit and receive data between a plurality of STAs through a wireless medium. The MPDU delivered from the MAC sub-layer 220 is referred to as a physical service data unit (PSDU) in the PLCP sub-layer 210. Although the MPDU is similar to the PSDU, if an aggregated MPDU (AMPDU) obtained by aggregating a plurality of MPDUs is delivered, the MPDUs may be individually different from the PSDUs.

The PLCP sub-layer 210 adds an additional field including information required by a transceiver of a physical layer in a process of receiving the PSDU from the MAC sub-layer 220 and delivering it to the PMD sub-layer 200. In this case, the field added to the PSDU may be a PLCP preamble, a PLCP header, and tail bits required to return a convolution encoder to a zero state.

The PLCP sub-layer 210 adds the aforementioned fields to the PSDU to generate a PLCP protocol data unit (PPDU) and transmits the PPDU to a receiving station through the PMD sub-layer 200. The receiving station receives the PPDU to perform restoration by obtaining information required to restore data from the PLCP preamble and the PLCP header.

Figure 3:
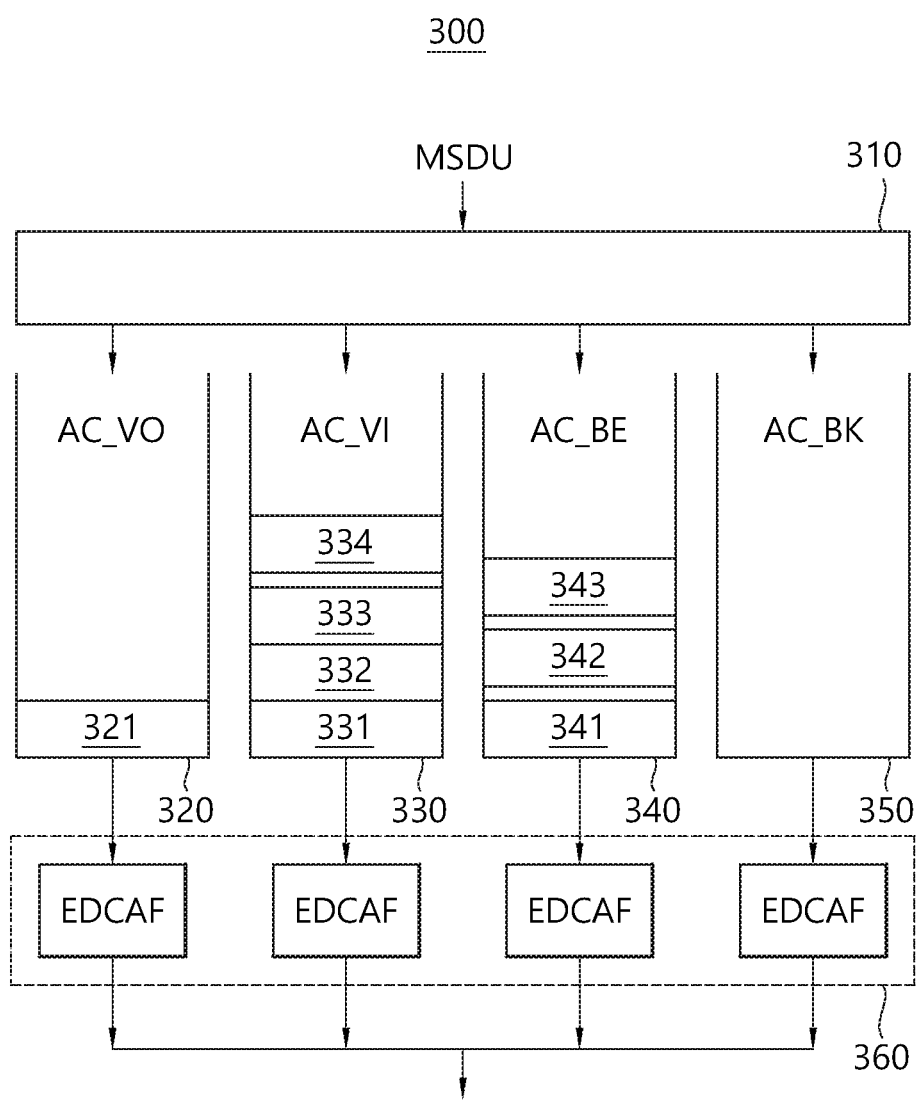
FIG. 3 is a conceptual view illustrating an STA that supports EDCA in a WLAN system.

FIG. 3 is a conceptual view illustrating an STA that supports EDCA in a WLAN system.

In the WLAN system, an STA (or AP) performing enhanced distributed channel access (EDCA) may perform channel access according to a plurality of user priority levels that are predefined for the traffic data.

The EDCA for the transmission of a Quality of Service (QoS) data frame based on the plurality of user priority levels may be defined as four access categories (hereinafter referred to as 'AC's) (background (AC_BK), best effort (AC_BE), video (AC_VI), and voice (AC_VO)).

An STA performing channel access based on the EDCA may map the traffic data, i.e., MAC service data unit (MSDU), departing from a logical link control (LLC) layer and reaching (or arriving at) a medium access control (MAC) layer, as shown below in Table 1. Table 1 is an exemplary table indicating the mapping between user priority levels and ACs.

TABLE 1

| Priority | User priority | Access category (AC) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

In the present embodiment, a transmission queue and a channel access parameter set may be defined for each AC. The plurality of user priorities may be implemented based on the channel access parameter set which is set differently for each AC.

When performing a backoff procedure for transmitting a frame belonging to each AC, the STA performing channel access based on the EDCA may use each of an arbitration interframe space (AIFS)[AC], a CWmin[AC], and a CWmax[AC] instead of a DCF interframe space (DIFS), a CWmin, and a CWmax, which correspond to parameters for a backoff procedure that is based on a distributed coordination function (DCF).

For reference, the default values of the parameters corresponding to each AC are shown in Table 2 below as an example.

TABLE 2

| AC | CWmin [AC] | CWmax [AC] | AIFS [AC] | TXOP limit [AC] |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

The EDCA parameters used in the backoff procedure for each AC may be set as default value or forwarded to each STA with being carried on a beacon frame from an AP to each STA. As AIFS [AC] and CWmin [AC] values decrease, a higher priority is given, and accordingly, the channel access delay shortens, thus allowing for use of more bands in a given traffic environment.

The EDCA parameter set element may include information on channel access parameters for each AC (e.g., AIFS [AC], CWmin[AC], CWmax[AC]).

In the case that a collision occurs between the STAs while the STA transmits a frame, an EDCA backoff procedure of generating a new backoff counter is similar to the existing DCF backoff procedure.

The differentiated backoff procedures for each AC may be performed based on different EDCA parameters. The EDCA parameters may become an important means used to differentiate channel access of various user priorities of traffic.

A proper configuration of the EDCA parameter value defined for each AC may increase the transport effect according to the priority of traffic while optimizing a network performance. Accordingly, an AP may perform the overall management and adjustment function for the EDCA parameters to ensure media accesses to all STAs that participate in the network.

In the present specification, a user priority level predefined (or preassigned) for traffic data (or traffic) may be referred to as a traffic identifier (hereinafter, 'TID').

The transmission priority level of traffic data may be determined based on a user priority level. Referring to Table 1, the traffic identifier (TID) of traffic data having the highest user priority level may be set to 7. That is, traffic data having a traffic identifier (TID) set to 7 may be understood as traffic having the highest transmission priority level.

Referring to FIG. 3, one STA (or AP) 300 may include a virtual mapper 310, a plurality of transmission queues 320 to 350, and a virtual collision handler 360.

The virtual mapper 310 of FIG. 3 may serve to map a MSDU received from a LLC layer to a transmission queue corresponding to each AC according to Table 1, which is illustrated above.

The plurality of transmission queues 320 to 350 of FIG. 3 may serve as individual EDCA contention entities for channel access for a wireless medium within one STA (or AP).

For example, a transmission queue 320 of an AC VO type of FIG. 3 may include one frame 321 for a second STA (not shown). A transmission queue 330 of an AC VI type may include three frames 331 to 333 for a first STA (not shown) and one frame 334 for a third STA (not shown) according to the order in which the frames are to be transmitted to a physical layer.

A transmission queue 340 of an AC BE type of FIG. 3 may include one frame 341 for the second STA (not shown), one frame 342 for the third STA (not shown), and one frame 343 for the second STA (not shown) according to the order in which the frames are to be transmitted to the physical layer. A transmission queue 350 of an AC BK type may not include a frame to be transmitted to the physical layer.

For example, internal backoff values for the transmission queue 320 of the AC VO type, the transmission queue 330 of the AC VI type, the transmission queue 340 of the AC BE type, and the transmission queue 350 of the AC BK type may be individually calculated based on Equation 1 below and a channel access parameter set (i.e., AIFS [AC], CWmin [AC], and CWmax [AC] in Table 2) for each AC.

The STA 300 may perform an internal backoff procedure based on an internal backoff value for each of the transmission queues 320, 330, 340, and 350. In this case, a transmission queue for which the internal backoff procedure is completed first may be understood as a transmission queue corresponding to a primary AC.

A frame included in a transmission queue corresponding to the primary AC may be transmitted to another entity (e.g., another STA or AP) during a transmission opportunity (hereinafter, 'TXOP'). When there are two or more ACs for which the backoff procedure has been completed at the same time, a collision between the ACs may be coordinated according to a function (EDCA function (EDCAF)) included in the virtual collision handler 360.

That is, when a collision occurs between the ACs, a frame included in an AC having a higher priority level may be transmitted first. In addition, the other ACs may increase a contention window value and may update a value set as a backoff count.

When one frame buffered in the transmission queue of the primary AC is transmitted, the STA may determine whether the STA can transmit the next frame in the same AC and can receive even the ACK of the next frame during the remaining time of the TXOP. In this case, the STA attempts to transmit the next frame after an SIFS time interval.

A TXOP limit value may be set as a default value in the AP and the STA, pr a frame associated with the TXOP limit value may be transmitted to the STA from the AP. When the size of a data frame to be transmitted exceeds the TXOP limit value, the STA may fragment the frame into a plurality of smaller frames. Subsequently, the fragmented frames may be transmitted within a range that does not exceed the TXOP limit value.

Figure 4:
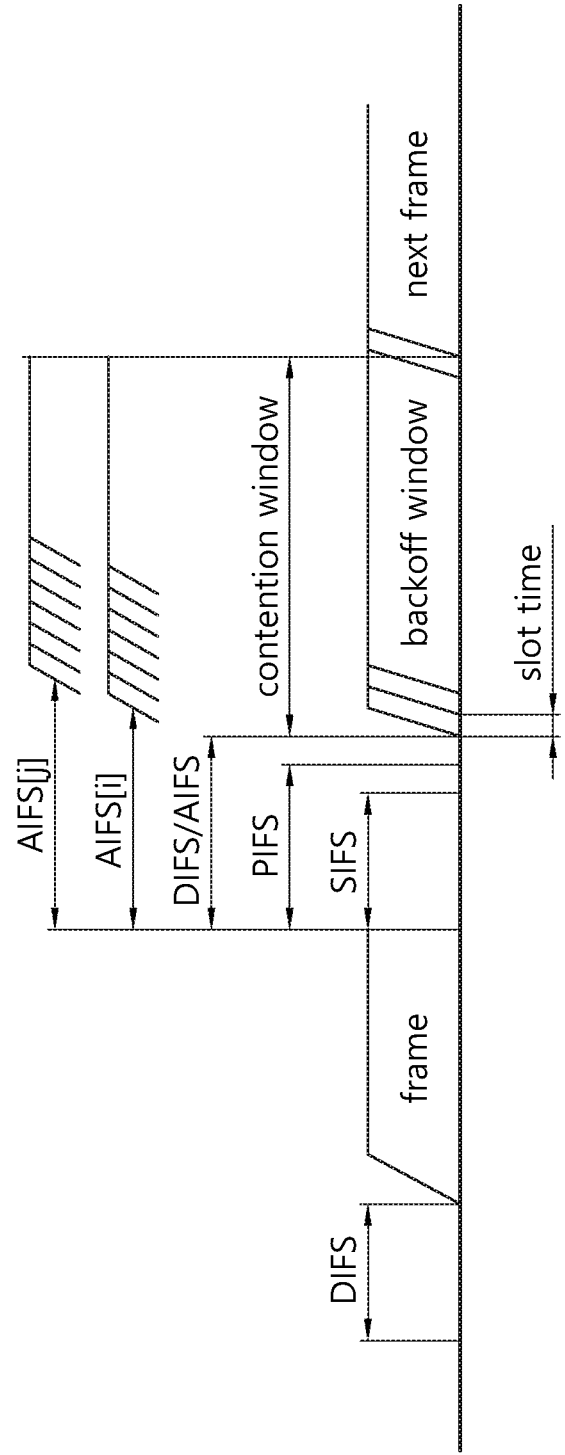
FIG. 4 is a conceptual view illustrating a backoff procedure according to EDCA.

FIG. 4 is a conceptual view illustrating a backoff procedure according to EDCA.

STAs may share a wireless medium based on a distributed coordination function (hereinafter, 'DCF'). The DCF is an access protocol for controlling a collision between STAs and may use a carrier sense multiple access/collision avoidance (hereinafter, 'CSMA/CA').

When it is determined that the wireless medium is not used during a DCF interframe space (DIFS) (i.e., when the wireless medium is idle) by the DCF, an STA may obtain a right to transmit an MPDU that is internally determined through the wireless medium. For example, the internally determined MPDU may be understood as the frame included in the transmission queue of the primary AC illustrated in FIG. 3.

When it is determined that the wireless medium is used by another STA during the DIFS (i.e., when the wireless medium is busy) by the DCF, the STA may wait until the wireless medium is idle in order to obtain a right to transmit the MPDU that is internally determined through the wireless medium.

Subsequently, the STA may defer channel access for the DIFS from the time at which the wireless medium is switched to the idle state. Then, the STA may wait for a contention window (hereinafter, 'CW') set in a backoff counter.

In order to perform the backoff procedure according to EDCA, each STA may set a backoff value, which is arbitrarily selected within the contention window (CW), in the backoff counter. For example, the backoff value set in the backoff counter of each STA to perform the backoff procedure according to EDCA may be associated with an internal backoff value used in an internal backoff procedure to determine the primary AC for each STA.

In addition, the backoff value set in the backoff counter of each STA may be a value newly set in the backoff counter of each STA for a transmission queue of the primary AC for each STA based on Equation 1 below and a channel access parameter set for each AC (i.e., AIFS [AC], CWmin [AC], and CWmax [AC] in Table 2).

In this specification, time expressing a backoff value, which is selected by each STA, in slot time may be interpreted and understood as the backoff window in FIG. 4.

Each STA may perform a countdown of reducing the backoff window set in the backoff counter by slot time. Among the plurality of STAs, an STA having the relatively shortest backoff window set may obtain a transmission opportunity (hereinafter, 'TXOP'), which is a right to occupy a wireless medium.

During a time period for the TXOP, the remaining STAs may suspend the countdown. The remaining STAs may wait until the time period for the TXOP expires. After the time period for the TXOP expires, the remaining STAs may resume the suspended countdown operation in order to occupy the wireless medium.

According to the transmission method based on the DCF, it is possible to prevent a collision between STAs which may occur when a plurality of STAs transmits frames at the same time. However, the channel access method using the DCF does not have the concept of transmission priority level (i.e., user priority level). That is, using the DCF does not guarantee the quality of service (QoS) of traffic to be transmitted by the STA.

In order to resolve this problem, a hybrid coordination function (hereinafter, 'HCF'), which is a new coordination function, is defined in 802.11e. The newly defined HCF has more enhanced performance than that of the existing channel access performance using the DCF. To enhance the QoS, the HCF may use two different types of channel access methods together, which are HCF-controlled channel access (HCCA) of a polling method and contention-based enhanced distributed channel access (EDCA).

Referring to FIG. 4, it may be assumed that the STA attempts to transmit buffered traffic data. User priority levels set for each traffic data may be differentiated as in Table 1. The STA may include four types (AC_BK, AC_BE, AC_VI, and AC_VO) of output queues mapped to the user priority levels illustrated in Table 1.

The STA may transmit traffic data based on an arbitration interframe space (AIFS) instead of the existing DCF interframe space (DIFS).

Hereinafter, in embodiments of the present invention, a wireless terminal (i.e., STA) may be a device that is capable of supporting both a WLAN system and a cellular system. That is, the wireless terminal may be construed as a UE supporting the cellular system or an STA supporting the WLAN system.

To facilitate the understanding of this specification, interframe spacing, which is mentioned in 802.11, is described. For example, interframe spacing (IFS) may correspond to a reduced interframe space (RIFS), a short interframe space (SIFS), a PCF interframe space (PIFS), a DCF interframe space (DIFS), an arbitration interframe space (AIFS), or an extended interframe space (EIFS).

The interframe spacing (IFS) may be determined depending on attributes specified by the physical layer of the STA regardless of the bit rate of the STA. Among the IFSs, IFSs other than the AIFS may be understood as a fixed value for each physical layer.

The AIFS may be set to a value corresponding to the four types of transmission queues mapped to the user priority levels illustrated in Table 2.

The SIFS has the shortest time gap among the IFSs mentioned above. Accordingly, the SIFS may be used when an STA occupying a wireless medium needs to maintain the occupation of the medium without any interruption by another STA during a period in which a frame exchange sequence is performed.

That is, by using the shortest gap between transmissions within a frame exchange sequence, the STA may be assigned priority to complete an ongoing frame exchange sequence. Also, the STA accessing the wireless medium by using the SIFS may immediately start transmission from the boundary of the SIFS without determining whether the medium is busy.

The duration of an SIFS for a specific physical (PHY) layer may be defined based on a SIFSTime parameter. For example, the SIFS has a value of 16 μs in physical (PHY) layers according to IEEE 802.11a, IEEE 802.11g, IEEE 802.11n, and IEEE 802.11ac.

The PIFS may be used in order to provide an STA with the next highest priority level after the SIFS. That is, the PIFS may be used to obtain priority for accessing the wireless medium.

The DIFS may be used by an STA transmitting a data frame (MPDU) and a management frame (MAC protocol data unit (MPDU)) on the basis the DCF. After a received frame and backoff time expire, when it is determined that the medium is idle by a CS mechanism, the STA may transmit a frame.

Figure 5:
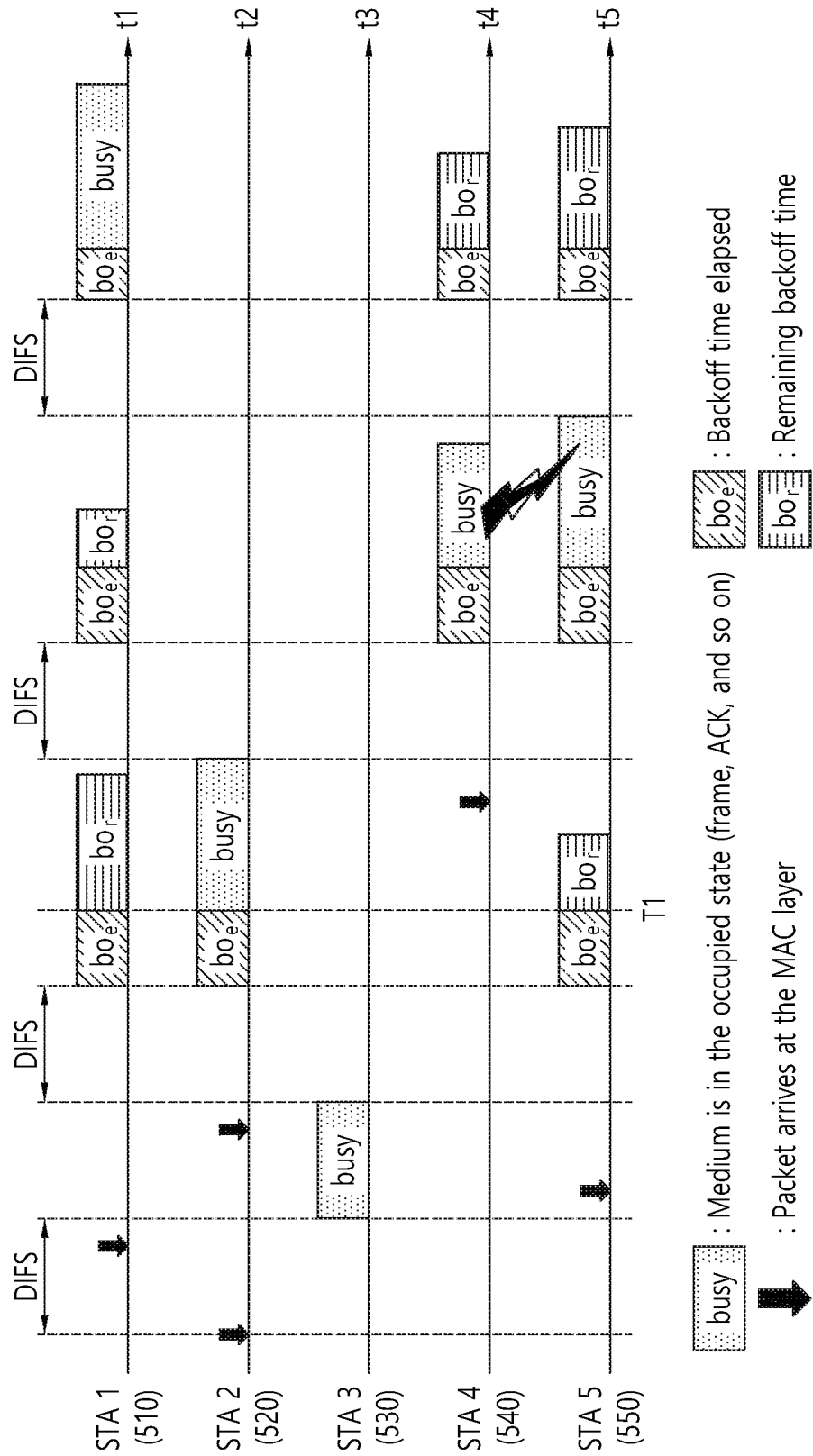
FIG. 5 illustrates a frame transmission procedure in a WLAN system.

FIG. 5 illustrates a frame transmission procedure in a WLAN system.

Referring to FIGS. 4 and 5, STAs 510, 520, 530, 540, and 550 in the WLAN system may individually set a backoff value in a backoff counter for each of the STAs 510, 520, 530, 540, and 550 in order to perform a backoff procedure according to EDCA.

Each of the STAs 510, 520, 530, 540, and 550 may attempt to perform transmission after waiting for time expressing the set backoff value in slot time (i.e., the backoff window in FIG. 4).

Further, each of the STAs 510, 520, 530, 540, and 550 may reduce the backoff window by slot time through a countdown. The countdown for channel access for the wireless medium may be individually performed by each STA.

Each STA may individually set random backoff time (Tb[i]) corresponding to the backoff window in the backoff counter for each STA. Specifically, the backoff time (Tb[i]) corresponds to a pseudo-random integer value and may be calculated by Equation 1 below.

$$T_b[i] = \text{Random}(i) \times \text{SlotTime} \qquad \text{[Equation 1]}$$

Random(i) in Equation 1 denotes a function using uniform distribution and generating a random integer between 0 and CW[i]. CW[i] may be construed as a contention window that is selected between a minimum contention window (CWmin[i]) and a maximum contention window (CWmax[i]).

For example, the minimum contention window (CWmin[i]) and the maximum contention window (CWmax[i]) may correspond to CWmin[AC] and CWmax[AC], which default values in Table 2.

For initial channel access, the STA may select a random integer between 0 and CWmin[i], with CW[i] set to CWmin[i] In this case, the selected random integer may be referred to as a backoff value.

In Equation 1, i may be construed as corresponding to a user priority level in Table 1. That is, traffic buffered for the STA may be construed as corresponding to any one of AC_VO, AC_VI, AC_BE, and AC_BK in Table 1 based on a value set for i in Equation 1.

SlotTime in Equation 1 may be used to provide sufficient time for a preamble of the transmitting STA to be detected by a neighboring STA. SlotTime in Equation 1 may be used to define the PIFS and the DIFS mentioned above. For example, SlotTime may be 9 μs.

For example, when the user priority level (i) is 7, an initial backoff time (Tb[7]) for a transmission queue of the AC_VO type may be time expressing a backoff value, which is selected between 0 and CWmin[AC_VO], in slot time.

When a collision occurs between STAs according to the backoff procedure (or when an ACK frame of a transmitted frame is not received), the STA may newly calculate increased backoff time (Tb[i]') by Equation 2 below.

$$CW_{new}[i] = ((CW_{old}[i]+1) \times PF) - 1 \qquad \text{[Equation 2]}$$

Referring to Equation 2, a new contention window ($CW_{new}[i]$) may be calculated based on a previous contention window ($CW_{old}[i]$). PF in Equation 2 may be calculated in accordance with a procedure defined in IEEE 802.11e. For example, PF in Equation 2 may be set to 2.

In the present embodiment, the increased backoff time (Tb[i]') may be construed as time expressing a random integer (i.e., backoff value), which is selected between 0 and the new contention window ($CW_{new}[i]$), in slot time.

CWmin[i], CWmax[i], AIFS[i], and PF values mentioned in FIG. 5 may be signaled from an AP through a QoS parameter set element, which is a management frame. The CWmin[i], CWmax[i], AIFS [i], and PF values may be values preset by the AP and the STA.

Referring to FIG. 5, the horizontal axis (t1 to t5) for first to fifth STAs 510 to 550 may indicate a time axis. The vertical axis for the first to fifth STAs 510 to 550 may indicate backoff time.

Referring to FIG. 4 and FIG. 5, if a particular medium is changed from an occupied or busy state to an idle state, the plurality of STAs may attempt to transmit data (or a frame).

Here, to minimize a collision between STAs, each STA may select backoff time (Tb[i]) according to Equation 1 and may attempt transmission after waiting for slot time corresponding to the selected backoff time.

When a backoff procedure is initiated, each STA may count down individually selected backoff counter time by slot times. Each STA may continuously monitor the medium while performing the countdown.

When the wireless medium is determined to be occupied, the STAs may suspend the countdown and may wait. When the wireless medium is determined to be idle, the STAs may resume the countdown.

Referring to FIG. 5, when a frame for the third STA 530 reaches the MAC layer of the third STA 530, the third STA 530 may determine whether the medium is idle during a DIFS. When it is determined that the medium is idle during the DIFS, the third STA 530 may transmit the frame to the AP (not shown). Here, although FIG. 5 shows the DIFS as an interframe space (IFS), it should be note that this specification will not be limited thereto.

While the frame is transmitted from the third STA 530, the remaining STAs may check the occupancy state of the medium and may wait for the transmission period of the frame. A frame may reach the MAC layer of each of the first STA 510, the second STA 520, and the fifth STA 550. When it is determined that the medium is idle, each STA may wait for the DIFS and may then count down backoff time individually selected by each STA.

FIG. 5 shows that the second STA 520 selects the shortest backoff time and the first STA 510 selects the longest backoff time. FIG. 5 shows that the remaining backoff time for the fifth STA 550 is shorter than the remaining backoff time for the first STA 510 at the time (T1) when a backoff procedure for the backoff time selected by the second STA 520 is completed and the transmission of a frame starts.

When the medium is occupied by the second STA 520, the first STA 510 and the fifth STA 550 may suspend the backoff procedure and may wait. When the second STA 520 finishes occupying the medium (i.e., when the medium returns to be idle), the first STA 510 and the fifth STA 550 may wait for the DIFS.

Subsequently, the first STA 510 and the fifth STA 550 may resume the backoff procedure based on the suspended remaining backoff time. In this case, since the remaining backoff time for the fifth STA 550 is shorter than the remaining backoff time for the first STA 510, the fifth STA 550 may complete the backoff procedure before the first STA 510.

Referring to FIG. 5, when the medium is occupied by the second STA 520, a frame for the fourth STA 540 may reach the MAC layer of the fourth STA 540. When the medium is idle, the fourth STA 540 may wait for the DIFS. Subsequently, the fourth STA 540 may count down the backoff time selected by the fourth STA 540.

Referring to FIG. 5, the remaining backoff time for the fifth STA 550 may coincidentally match the remaining backoff time for the fourth STA 540. In this case, a collision may occur between the fourth STA 540 and the fifth STA 550. If the collision occurs between the STAs, both the fourth STA 540 and the fifth STA 550 may not receive an ACK and may fail to transmit data.

Accordingly, the fourth STA 540 and the fifth STA 550 may individually calculate a new contention window ($CW_{new}[i]$) according to Equation 2. Subsequently, the fourth STA 540 and the fifth STA 550 may individually count down backoff time newly calculated according to Equation 2.

When then medium is occupied state due to transmission by the fourth STA 540 and the fifth STA 550, the first STA 510 may wait. Subsequently, when the medium is idle, the first STA 510 may wait for the DIFS and may then resume backoff counting. After the remaining backoff time for the first STA 510 elapses, the first STA 510 may transmit a frame.

The CSMA/CA mechanism may include virtual carrier sensing in addition to physical carrier sensing in which an AP and/or STA directly senses a medium.

Virtual carrier sensing is used to address any problem that may occur in access to a medium, such as a hidden node problem. For virtual carrier sensing, the MAC of a WLAN system uses a network allocation vector (NAV). The NAV is a value representing remaining time for a medium to be available, which is indicated by an AP and/or STA currently using the medium or having the right to use the medium to another AP and/or STA.

Therefore, a value set as the NAV corresponds to a period in which an AP and/or STA transmitting a frame is scheduled to use a medium, and an STA receiving the NAV value is prohibited from accessing the medium during the period. The NAV may be set, for example, according to the value of a duration field in an MAC header.

Figure 6:
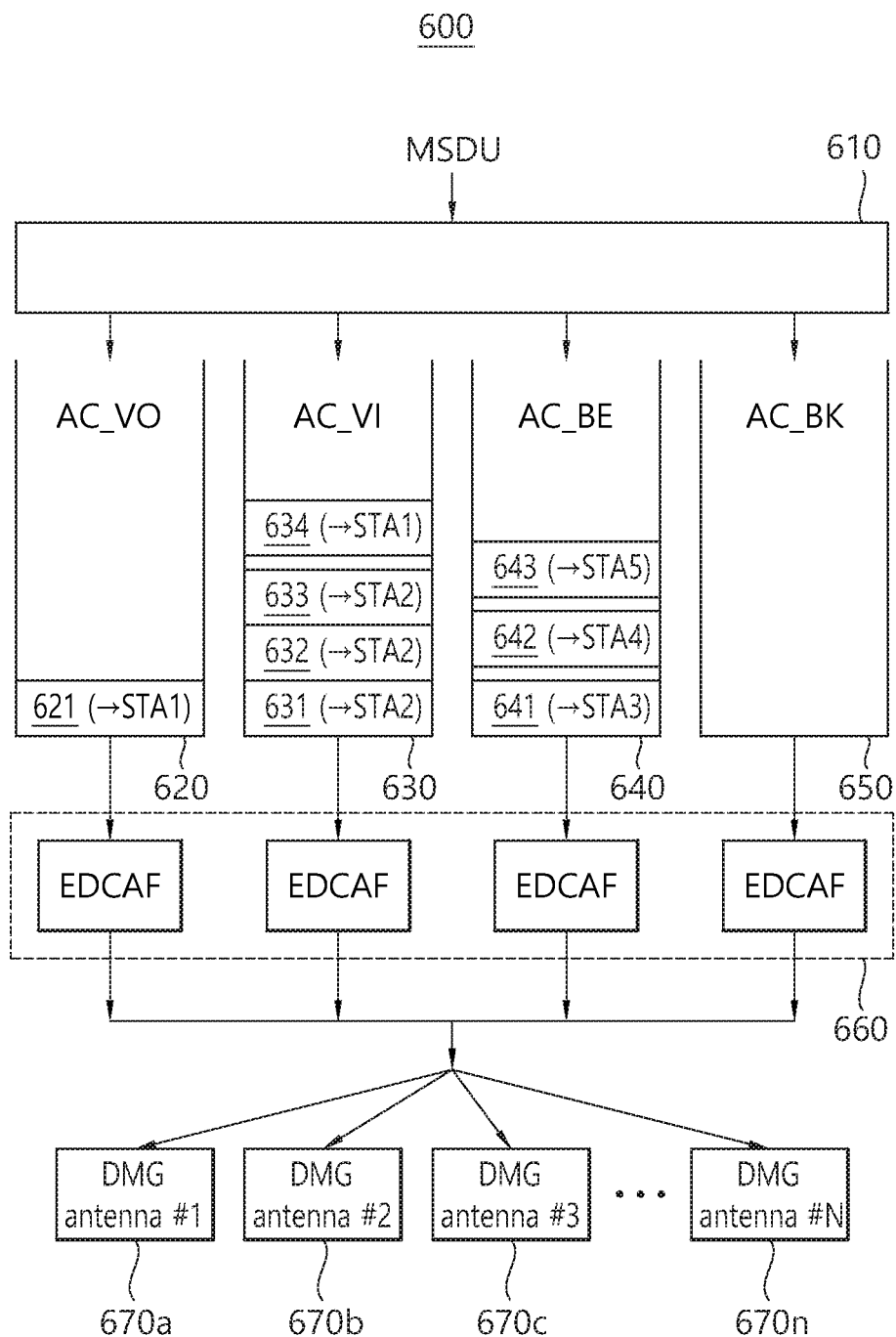
FIG. 6 is a conceptual view illustrating a wireless terminal that transmits a frame in a WLAN system according to one embodiment.

FIG. 6 is a conceptual view illustrating a wireless terminal that transmits a frame in a WLAN system according to one embodiment.

Referring to FIG. 6, the wireless terminal 600 according to the present embodiment may include a virtual mapper 610, a plurality of transmission queues 620 to 650, a virtual collision handler 660, and a plurality of directional antenna modules 670a to 670n.

Referring to FIGS. 1 to 6, descriptions of the virtual mapper 610, the plurality of transmission queues 620 to 650, and the virtual collision handler 660 in FIG. 6 are substantially the same as the descriptions of the virtual mapper 310, the plurality of transmission queues 320 to 350, and the virtual collision handler 360 in FIG. 3.

According to the embodiment of FIG. 6, the wireless terminal 600 may have an internal structure in which one set of transmission queues 620, 630, 640, and 650 in the wireless terminal is associated with the plurality of directional antenna modules 670a to 670n.

A directional multi-gigabit (DMG) antenna according to the present embodiment may include a plurality of physical antennas. Further, the DMG antenna according to the present embodiment may be construed as a set of a plurality of physical (or logical) antennas arranged in one direction.

For the clear and concise description of the present specification, a first directional antenna module 670a may include a first DMG antenna associated with a first user terminal (not shown), and a second directional antenna module 670b may include a second DMG antenna associated with a second user terminal (not shown).

Further, a third directional antenna module 670c may include a third DMG antenna associated with a third user terminal (not shown), and an Nth directional antenna module 770n (n is a natural number) may include an Nth DMG antenna associated with an Nth STA (N is a natural number).

Hereinafter, it is assumed that the wireless terminal 600 of FIG. 6 includes five directional antenna modules 670a to 670e. The wireless terminal 600 of FIG. 6 may associate a plurality of data frames 621, 631 to 634, and 641 to 643 with the plurality of directional antenna modules 670a to 670n based on receive address (hereinafter, 'RA') information configured for each of the plurality of data frames 621, 631 to 634, and 641 to 643.

A first data frame 621 may be buffered in a transmission queue 620 of the AC VO type. For example, the first data frame 621 may be construed as an MPDU including RA information indicating the first user terminal (not shown).

Second to fifth data frames 631 to 634 may be buffered in a transmission queue 630 of the AC VI type. For example, the second to fourth data frames 631, 632, and 633 may be construed as MPDUs including RA information indicating the second user terminal (not shown). For example, the fifth data frame 634 may be construed as an MPDU including RA information indicating the first user terminal (not shown).

Sixth to eighth data frames 641 to 643 may be buffered in a transmission queue 640 of the AC BE type. For example, the sixth data frame 641 may be construed as an MPDU including RA information indicating the third user terminal (not shown).

For example, the seventh data frame 642 may be construed as an MPDU including RA information indicating a fourth user terminal (not shown). For example, the eighth data frame 643 may be construed as an MPDU including RA information indicating a fifth user terminal (not shown).

It should be noted that the plurality of data frames included in the transmission queues illustrated in FIG. 6 is merely an example, and the present specification is not limited thereto.

The data frames buffered in the plurality of transmission queues according to the present embodiment may be transmitted through the respective directional antenna modules 670a to 670n according to the RA information included in each data frame.

For example, the first data frame 621 and the fifth data frame 634 may be transmitted through the first directional antenna module 670a. The second to fourth data frames 631, 632, and 633 may be transmitted through the second directional antenna module 670b.

The sixth data frame 641 may be transmitted through the third directional antenna module 670c. The seventh data frame 642 may be transmitted through the fourth directional antenna module 670d. The eighth data frame 643 may be transmitted through the fifth directional antenna module 670e.

A legacy wireless terminal may perform an omnidirectional clear channel assessment (CCA) procedure. Specifically, a legacy STA may compare the power level of a signal received during a certain time (e.g., DIFS) from the physical layer of the wireless terminal according to an omnidirectional method with a preset threshold level, thereby determining the state of a wireless medium.

For example, if the power level of the signal received from the physical layer is lower than the threshold level, the state of the wireless medium may be determined to be idle. If the power level of the signal received from the physical layer is higher than the threshold level, the state of the wireless medium may be determined to be busy.

The wireless terminal 600 according to the present embodiment may cover a plurality of directions associated with the plurality of directional antenna modules 670a to 670n according to a directional method. Specifically, the wireless terminal 600 may perform an individual directional CCA procedure for a plurality of radio channels corresponding to the plurality of directions for a certain time.

That is, the wireless terminal 600 may individually determine the states of the plurality of radio channels associated with the plurality of directional antenna modules 670a to 670n for a plurality of user terminals (not shown).

Hereinafter, CCA operations that the wireless terminal according to the present embodiment simultaneously performs for the plurality of directions may be referred to as a directional CCA procedure.

Each of the plurality of directional antenna modules 670a to 670n may be associated with a radio channel in a particular direction for each user terminal (not shown).

The wireless terminal according to the present embodiment may simultaneously perform a plurality of individual directional CCA procedures according to the directional scheme. That is, a first radio channel may be determined to be busy by a first directional CCA procedure for a first direction among the plurality of directions, and a second radio channel may be determined to be idle by a second directional CCA procedure for a second direction.

Likewise, an Nth radio channel in an Nth direction for an Nth user terminal (not shown) may be determined to be idle (or busy) by a directional CCA procedure.

The wireless terminal according to the present embodiment may transmit data (or a data frame) included in a transmission queue of a primary AC based on at least one directional antenna module associated with at least one radio channel determined to be idle.

Further, the wireless terminal according to the present embodiment may transmit a data frame included in a transmission queue of a primary AC and data (or a data frame) included in a transmission queue of a secondary AC together based on at least one directional antenna module associated with at least one radio channel determined to be idle.

In addition, although not described in association with FIG. 6, the plurality of directional antenna modules 670a to 670n may be used to receive a radio signal transmitted from other wireless terminals.

It should be noted that the internal structure of the wireless terminal shown in FIG. 6 is merely an example, and that the wireless terminal of the present specification may be configured based on a structure in which a plurality of sets of transmission queues corresponds to a plurality of antenna modules.

Figure 7:
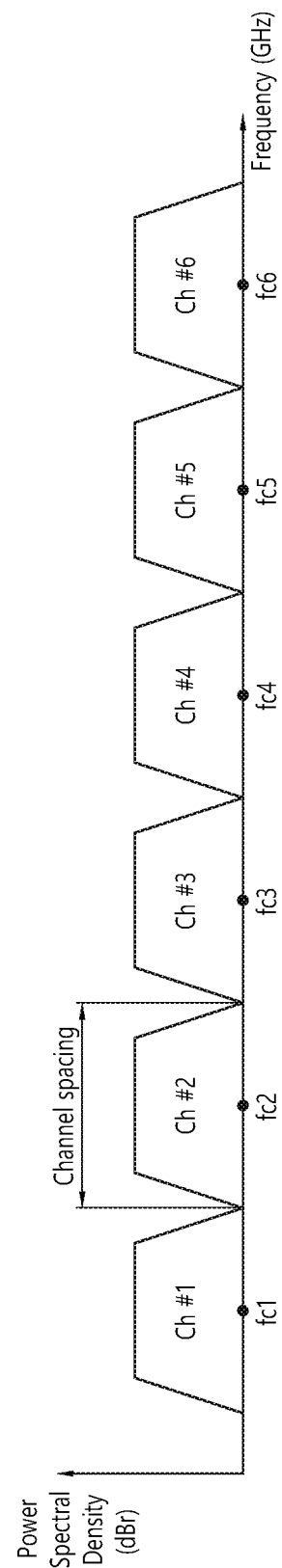
FIG. 7 illustrates a plurality of channels channelized to transmit a frame in a WLAN system according to one embodiment.

FIG. 7 illustrates a plurality of channels channelized to transmit a frame in a WLAN system according to one embodiment.

The horizontal axis in FIG. 7 may represent the frequency (GHz) in a 60 GHz band. The vertical axis in FIG. 7 may represent the level (dBr) of a signal relative to maximum spectral density.

Referring to FIG. 7, first to sixth channels (ch#1 to ch#6) may be sequentially allocated on the frequency in order to support the transmission and reception operations of a wireless terminal according to the present embodiment in the 60 GHz band. For example, the channel spacing of each of the first to sixth channels (ch#1 to ch#6) may be 2,160 MHz.

A channel center frequency for each of the first to sixth channels (ch#1 to ch#6) according to the present embodiment may be defined by Equation 3. For example, a channel starting frequency may be 56.16 GHz.

channel center frequency=channel starting frequency+channel spacing×channel number [Equation 3]

According to Equation 3, a first channel center frequency (fc1) for the first channel (ch#1) may be 58.32 GHz. For example, the first channel (ch#1) in FIG. 7 may be defined to range between 57.24 GHz and 59.40 GHz.

According to Equation 3, a second channel center frequency (fc2) for the second channel (ch#2) may be 60.48 GHz. For example, the second channel (ch#2) in FIG. 7 may be defined to range between 59.40 GHz and 61.56 GHz.

According to Equation 3, a third channel center frequency (fc3) for the third channel (ch#3) may be 62.64 GHz. For example, the third channel (ch#3) in FIG. 7 may be defined to range between 61.56 GHz and 63.72 GHz.

According to Equation 3, a fourth channel center frequency (fc4) for the fourth channel (ch#4) may be 64.80 GHz. For example, the fourth channel (ch#4) in FIG. 7 may be defined to range between 63.72 GHz and 65.88 GHz.

According to Equation 3, a fifth channel center frequency (fc5) for the fifth channel (ch#5) may be 66.96 GHz. For example, the fifth channel (ch#5) in FIG. 7 may be defined to range between 65.88 GHz and 68.04 GHz.

According to Equation 3, a sixth channel center frequency (fc6) for the sixth channel (ch#6) may be 69.12 GHz. For example, the sixth channel (ch#6) in FIG. 7 may be defined to range between 68.04 GHz and 70.2 GHz.

Concrete details of channelization and channel numbering mentioned herein are provided in Section 19.3.15 in IEEE Draft P802.11-REVmc™ D8.0, disclosed in August 2016 and in Section 21.3.1, Section 21.3.2, and Annex E in IEEE Std 802.11ad™, disclosed in December 2012.

A wireless terminal according to the present specification may transmit a frame based on a radio channel allocated for each of the plurality of antenna modules 670a to 670n illustrated above in FIG. 6. Here, the radio channel may be construed as a multi-channel in which a channel bonding scheme or a channel aggregation scheme is applied to the plurality of channels ch#1 to ch#6 in FIG. 7.

Hereinafter, a procedure for reporting bandwidth information for a radio channel to which channel bonding or channel aggregation is applied in order to maximize the performance gain of a WLAN system will be described.

Figure 8:
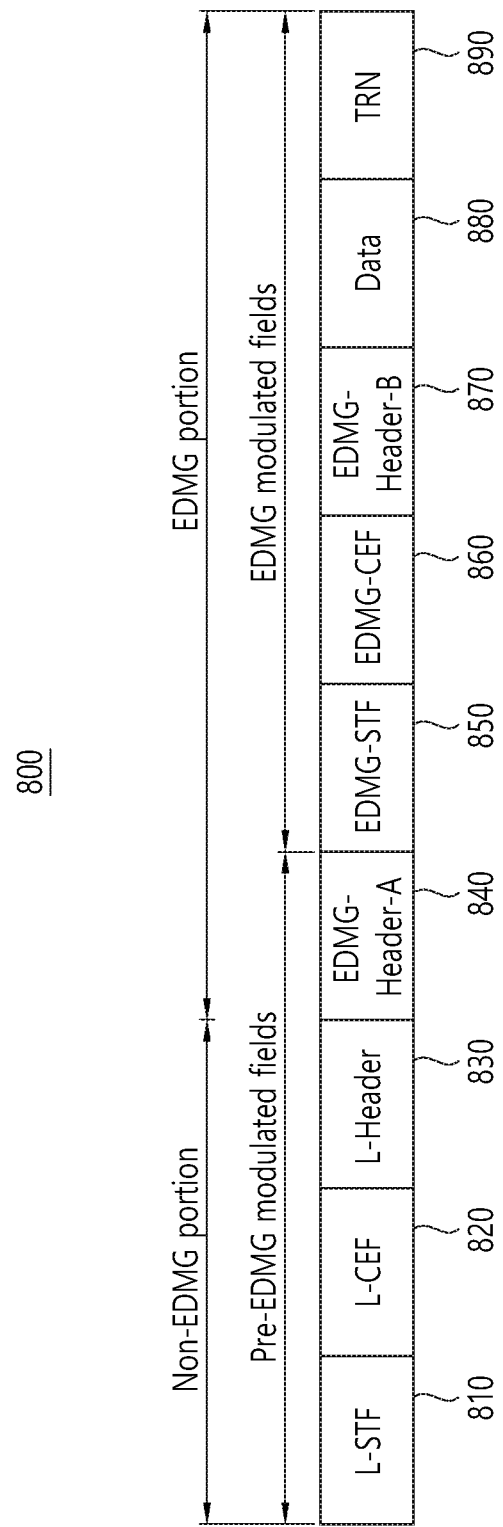
FIG. 8 illustrates the format of an EDMG PPDU according to one embodiment.

FIG. 8 illustrates the format of an enhanced directional multi-gigabit (EDMG) PPDU according to one embodiment. Referring to FIGS. 1 to 8, FIG. 8 shows the format of an EDMG PPDU according to IEEE 802.11ay.

Referring to FIG. 8, the EDMG PPDU 800 may include a plurality of fields 810 to 890. It may be assumed that a wireless terminal according to the present specification is in an EDMG control mode. The wireless terminal in the EDMG control mode may transmit a control frame.

For example, the control frame may be a Request to Send (RTS) frame. A detailed description of the RTS frame is provided in Section 9.3.1.2 in Part 11: Wireless LAN Medium Access Control (MAC) and Physical Layer (PHY) Specifications approved in December 2016.

In another example, the control frame may be a directional multi-gigabit Clear to Send (DMG CTS) frame. A detailed description of the DMG DTS frame is provided in Section 9.3.1.14 in Part 11: Wireless LAN Medium Access Control (MAC) and Physical Layer (PHY) Specifications approved in December 2016.

In still another example, the control frame may be a directional multi-gigabit Clear to Send Denial to Send (DMG DTS) frame. A detailed description of the DMG DTS frame is provided in Section 9.3.1.15 in Part 11: Wireless LAN Medium Access Control (MAC) and Physical Layer (PHY) Specifications approved in December 2016.

According to the present embodiment, the EDMG PPDU 800 transmitted by the wireless terminal in the EDMG control mode may be referred to as an EDMG control mode PPDU.

The EDMG control mode PPDU 800 may include an L-STF field 810, an L-CEF field 820, and an L-Header field 830 corresponding to a non-EDMG portion.

For example, the non-EDMG portion 810, 820, and 830 of the EDMG control mode PPDU 800 may be duplicated and transmitted through a plurality of channels (e.g., ch#1 to ch#6 in FIG. 7). For example, the non-EDMG portion 810, 820, and 830 of the EDMG control mode PPDU 800 may be transmitted through any one of a plurality of channels (e.g., ch#1 to ch#6 in FIG. 7).

Further, the EDMG control mode PPDU may include an EDMG Header-A field 840, a Data field 880, and a TRN field 890 corresponding to an EDMG portion.

The L-STF field 810 included in the EDMG control mode PPDU may be construed as a field for packet detection.

The L-CEF field 820 included in the EDMG control mode PPDU may be construed as a field for channel estimation.

The L-Header field 830 included in the EDMG control mode PPDU may include a plurality of fields illustrated below in Table 3.

the EDMG-Header-A field. For example, when the EDMG control mode PPDU includes a DMG CTS frame, a DMG DTS frame, or a CTS-to-self frame, the Scrambler Initialization field may include information on a channel bandwidth for the EDMG control mode PPDU.

Referring to FIGS. 7 and 8, when the channel bonding scheme is applied to the multi-channel for the wireless terminal, a plurality of contiguous channels on the frequency among the first to sixth channels (ch#1 to ch#6) may be used.

Further, when the channel aggregation scheme is applied to the multi-channel for the wireless terminal, a plurality of noncontiguous channels on the frequency among the first to sixth channels (ch#1 to ch#6) may be used.

Bandwidth information on combinable radio channels according to the channel bonding scheme or channel aggregation scheme may be signaled to the reception terminal using additional one bit in Table 3 along with four bits for the Scrambler Initialization field in Table 3.

For example, the additional one bit may be construed as a Differential Encoder Initialization field, a Turnaround field, or part of reserved bits in Table 3.

A process for transmitting the bandwidth information on the combinable radio channels according to the channel bonding scheme or the channel aggregation scheme based on a total of five bits (i.e., four bits for the Scrambler Initialization field in Table 3 and additional one bit in Table 3) will be described in more detail with reference to FIG. 9.

The EDMG Header-A field 840 included in the EDMG control mode PPDU may include information required to interpret the EDMG PPDU. According to the above assumption, when the EDMG PPDU is an EDMG control mode PPDU, a plurality of contents in the EDMG Header-A field 840 are partitioned between a first low-density parity-check (LDPC) codeword and a second LDPC codeword.

Content included in the first LDPC codeword may be referred to as an EDMG-Header-A1 subfield. For example, the EDMG-Header-A1 subfield may include six octets. For example, the EDMG-Header-A1 subfield may include bandwidth information on a plurality of channels (e.g., a plurality of 2.16 GHz channels) for transmitting the EDMG PPDU, information on a primary channel, information on the length

TABLE 3

| Field name | Number of bits | starting bit | Description |
| --- | --- | --- | --- |
| Differential encoder initialization | 1 | 0 | Used to initialize the differential encoding. |
| Scrambler Initialization | 4 | 1 | Bits X1-X4 of the initial scrambler state. |
| Length | 10 | 5 | number of data octets in the PSDU. Range 14-1023. |
| Packet Type | 1 | 15 | As defined in Table 20-17 (DMG SC mode header fields). |
| Training Length | 5 | 16 | Length of the training field. The use of this field is defined in 20.10.2.2.3 (BRP packet header fields). |
| Turnaround | 1 | 21 | As defined in Table 20-1 (TXVECTOR and RXVECTOR parameters). |
| Reserved bits | 2 | 22 | |
| HCS | 16 | 24 | Header Check sequence. Calculation of the header check sequence is definel in 20.3.7 (HCS calculation for headers of DMG control mode. DMG OFDM mode, and DMG SC mode). |

According to a conventional method, various pieces of control information may be transmitted to a reception terminal using a four-bit Scrambler Initialization field in Table 3.

For example, the Scrambler Initialization field may include information on a control trailer and information on of a PSDU included in the EDMG PPDU, and information on the length of the TRN field 890.

Content included in the second LDPC codeword may be referred to as an EDMG-Header-A2 subfield. For example, the EDMG-Header-A2 subfield may include three octets. For example, the EDMG-Header-A2 subfield may include information on the number of transmission chains used to transmit the EDMG PPDU and information on a cyclic redundancy check (CRC).

The Data field 880 included in the EDMG control mode PPDU may carry the PSDU. The PSDU included in the Data field 880 may correspond to a payload.

The TRN (training sequence) field 890 included in the EDMG control mode PPDU may include information enabling transmit and receive antenna weight vector (AWV) training by a plurality of STAs.

Figure 9:
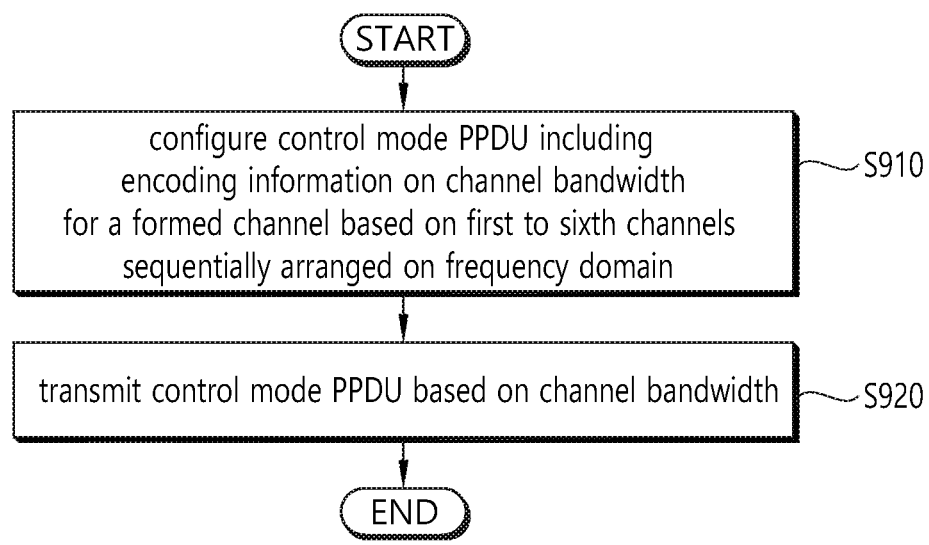
FIG. 9 is a flowchart illustrating a method for transmitting a frame based on a plurality of channelized channels in a WLAN system according to one embodiment.

FIG. 9 is a flowchart illustrating a method for transmitting a frame based on a plurality of channelized channels in a WLAN system according to one embodiment.

Referring to FIGS. 1 to 9, in step S910, a first wireless terminal may configure a control mode physical protocol data unit (PPDU) including encoding information on a channel bandwidth for a formed channel based on first to sixth channels sequentially arranged on a frequency domain.

For example, the first to sixth channels mentioned in FIG. 9 may correspond to the first to sixth channels (ch#1 to ch#6) in FIG. 7. For example, the control mode PPDU may be construed as the EDMG control mode PPDU 800 mentioned in FIG. 8.

According to the embodiment of FIG. 9, the encoding information may include five bits in total. Here, a total of five bits may correspond to the Scrambler Initialization field (i.e., four bits) and additional one bit in the L-Header field 830 included in the EDMG control mode PPDU.

As shown below in Table 4, the encoding information may indicate a channel bandwidth (BW) for the control mode PPDU to be transmitted by the first wireless terminal based on a total of five bits (B0 to B4) corresponding to the Scrambler Initialization field (i.e., four bits) in Table 3 and the Turnaround field (i.e., one bit) in Table 3.

TABLE 4

| Bit field | | | | | Definition |
|---|---|---|---|---|---|
| B0 | B1 | B2 | B3 | B4 | |
| 0 | 0 | Reserved | Reserved | 0 | Indicates the presence of the control trailer |
| 0 | 1 | Reserved | Reserved | 0 | Indicates the presence of the EDMG- Header-A field. The implies that the PPDU is an EDMG control mode PPDU. |
| | | Channel BW | | | When the PPDU contains an RTS, a DMG CTS or a DMG DTS frame, the Channel BW field indicates the bandwidth of the PPDU. |

For example, first to fourth bits (B0 to B3) in Table 4 may be construed as bits for the Scrambler Initialization field in Table 3. For example, a fifth bit (B4) in Table 4 may be construed as a bit for the Turnaround field in Table 3.

A first value for indicating the channel bandwidth for the control mode PPDU may be set not to affect an existing operation mentioned in Table 4 (i.e., where B0 or B1 is 00 or 01).

When the first value is set as a value for the channel bandwidth for the control mode PPDU, the channel bandwidth for a formed channel based on the first to sixth channels (i.e., ch#1 to ch#6 in FIG. 7) may be construed as the bandwidth for a single channel.

For example, the first value may be a value (10000, i.e., 16) indicated based on the five bits (B0 to B4). In another example, the first value may be set to 16 minus 1, which is 15.

When the first value is set as the value for the channel bandwidth for the control mode PPDU, the bandwidth (i.e., 2.16 GHz) of one of the first to sixth channels (i.e., ch#1 to ch#6 in FIG. 7) may be indicated as in Table 5.

TABLE 5

| ch#1 | ch#2 | ch#3 | ch#4 | ch#5 | ch#6 |
|---|---|---|---|---|---|
| x | — | — | — | — | — |
| — | x | — | — | — | — |
| — | — | x | — | — | — |
| — | — | — | x | — | — |
| — | — | — | — | x | — |
| — | — | — | — | — | x |

In Table 5, 'x' may indicate a used channel. In Table 5, '—' may indicate an unused channel.

When a second value is set as a value for the channel bandwidth for the control mode PPDU, a channel bandwidth (i.e., 4.32 GHz or 2.16 GHz+2.16 GHz) formed based on two channels among the first to sixth channels (i.e., ch#1 to ch#6) may be construed as a bandwidth according to the channel bonding scheme.

For example, the second value may be a value (10001, i.e., 17) indicated based on the five bits (B0 to B4). In another example, the second value may be set to 17 minus 1, which is 16.

When the second value is set as the value for the channel bandwidth for the control mode PPDU, the channel bonding scheme may be applied to the two channels among the first to sixth channels (i.e., ch#1 to ch#6 in FIG. 7) as in Table 6.

TABLE 6

| ch#1 | ch#2 | ch#3 | ch#4 | ch#5 | ch#6 |
|---|---|---|---|---|---|
| x | x | — | — | — | — |
| — | — | x | x | — | — |
| — | — | — | — | x | x |

When a third value is set as a value for the channel bandwidth for the control mode PPDU, a channel bandwidth (i.e., 4.32 GHz or 2.16 GHz+2.16 GHz) formed based on two channels among the first to sixth channels (i.e., ch#1 to ch#6) may be construed as a bandwidth according to the channel bonding scheme or the channel aggregation scheme.

For example, the third value may be a value (10010, i.e., 18) indicated based on the five bits (B0 to B4). In another example, the third value may be set to 18 minus 1, which is 17.

When the third value is set as the value for the channel bandwidth for the control mode PPDU, the channel bonding scheme may be applied to the two channels among the first to sixth channels (i.e., ch#1 to ch#6 in FIG. 7) as in Table 7.

TABLE 7

| ch#1 | ch#2 | ch#3 | ch#4 | ch#5 | ch#6 |
|---|---|---|---|---|---|
| — | x | X | — | — | — |
| — | — | — | x | x | — |
| x | — | — | — | — | x |

When a fourth value is set as a value for the channel bandwidth for the control mode PPDU, a channel bandwidth (i.e., 6.48 GHz) formed based on three channels among the first to sixth channels (i.e., ch#1 to ch#6) may be construed as a bandwidth according to the channel bonding scheme.

For example, the fourth value may be a value (10011, i.e., 19) indicated based on the five bits (B0 to B4). In another example, the fourth value may be set to 19 minus 1, which is 18.

When the fourth value is set as the value for the channel bandwidth for the control mode PPDU, the channel bonding scheme may be applied to the three channels among the first to sixth channels (i.e., ch#1 to ch#6 in FIG. 7) as in Table 8.

TABLE 8

| ch#1 | ch#2 | ch#3 | ch#4 | ch#5 | ch#6 |
|------|------|------|------|------|------|
| x    | X    | x    | —    | —    | —    |
| —    | —    | —    | X    | x    | x    |

That is, the fourth value may be a value for a first channel pattern formed based on the first to third channels (ch#1 to ch#3) and a second channel pattern formed based on the fourth to sixth channels (ch#4 to ch#6).

For example, a second wireless terminal may determine one of the first channel pattern and the second channel pattern as a channel bandwidth for the control mode PPDU based on a channel via which a legacy part (e.g., 810 to 830 in FIG. 8) of the control mode PPDU is received.

That is, the second wireless terminal may receive the legacy part (e.g., 810 to 830 in FIG. 8) of the control mode PPDU based on a predetermined primary channel.

For example, it may be assumed that the primary channel for the second wireless terminal is one of the first to third channels (ch#1 to ch#3). In this case, when the fourth value is indicated through the L-Header 830 of the control mode PPDU, the second wireless terminal may receive the remaining fields (e.g., 840 to 890 in FIG. 8) after the L-Header 830 of the control mode PPDU based on the first channel pattern.

In another example, it may be assumed that the primary channel for the second wireless terminal is one of the fourth to sixth channels (ch#4 to ch#6). In this case, when the fourth value is indicated through the L-Header 830 of the control mode PPDU, the second wireless terminal may receive the remaining fields after the L-Header 830 of the control mode PPDU based on the second channel pattern.

That is, when a value for a channel bandwidth corresponds to a plurality of channel patterns, the second wireless terminal may determine any one of the plurality of channel patterns as a channel bandwidth for the second wireless terminal based on the predetermined primary channel.

When a fifth value is set as a value for the channel bandwidth for the control mode PPDU, a channel bandwidth (i.e., 6.48 GHz) formed based on three channels among the first to sixth channels (i.e., ch#1 to ch#6) may be construed as a bandwidth according to the channel bonding scheme.

For example, the fifth value may be a value (10100, i.e., 20) indicated based on the five bits (B0 to B4). In another example, the fifth value may be set to 20 minus 1, which is 19.

When the fifth value is set as the value for the channel bandwidth for the control mode PPDU, the channel bonding scheme may be applied to the three channels among the first to sixth channels (i.e., ch#1 to ch#6 in FIG. 7) as in Table 9.

TABLE 9

| ch#1 | ch#2 | ch#3 | ch#4 | ch#5 | ch#6 |
|------|------|------|------|------|------|
| —    | x    | x    | x    | —    | —    |

That is, the fifth value may be a value for a channel pattern formed based on the second to fourth channels (ch#2 to ch#4).

When a sixth value is set as a value for the channel bandwidth for the control mode PPDU, a channel bandwidth (i.e., 6.48 GHz) formed based on three channels among the first to sixth channels (i.e., ch#1 to ch#6) may be construed as a bandwidth according to the channel bonding scheme.

For example, the sixth value may be a value (10101, i.e., 21) indicated based on the five bits (B0 to B4). In another example, the sixth value may be set to 21 minus 1, which is 20.

When the sixth value is set as the value for the channel bandwidth for the control mode PPDU, the channel bonding scheme may be applied to the three channels among the first to sixth channels (i.e., ch#1 to ch#6 in FIG. 7) as in Table 10.

TABLE 10

| ch#1 | ch#2 | ch#3 | ch#4 | ch#5 | ch#6 |
|------|------|------|------|------|------|
| —    | —    | x    | x    | x    | —    |

That is, the sixth value may be a value for a channel pattern formed based on the third to fifth channels (ch#3 to ch#5).

When a seventh value is set as a value for the channel bandwidth for the control mode PPDU, a channel bandwidth (i.e., 8.64 GHz or 4.32 GHz+4.32 GHz) formed based on fourth channels among the first to sixth channels (i.e., ch#1 to ch#6) may be construed as a bandwidth according to the channel bonding scheme or the channel aggregation scheme.

For example, the seventh value may be a value (10110, i.e., 22) indicated based on the five bits (B0 to B4). In another example, the seventh value may be set to 22 minus 1, which is 21.

When the seventh value is set as the value for the channel bandwidth for the control mode PPDU, the channel bonding scheme or the channel aggregation scheme may be applied to the fourth channels among the first to sixth channels (i.e., ch#1 to ch#6 in FIG. 7) as in Table 11.

TABLE 11

| ch#1 | ch#2 | ch#3 | ch#4 | ch#5 | ch#6 |
|------|------|------|------|------|------|
| x    | x    | x    | x    | —    | —    |

That is, the seventh value may be a value for a channel pattern formed based on the first to fourth channels (ch#1 to ch#4).

When an eighth value is set as a value for the channel bandwidth for the control mode PPDU, a channel bandwidth (i.e., 8.64 GHz or 4.32 GHz+4.32 GHz) formed based on fourth channels among the first to sixth channels (i.e., ch#1 to ch#6) may be construed as a bandwidth according to the channel bonding scheme or the channel aggregation scheme.

For example, the eighth value may be a value (10111, i.e., 23) indicated based on the five bits (B0 to B4). In another example, the eighth value may be set to 23 minus 1, which is 22.

When the eighth value is set as the value for the channel bandwidth for the control mode PPDU, the channel bonding scheme or the channel aggregation scheme may be applied to the fourth channels among the first to sixth channels (i.e., ch#1 to ch#6 in FIG. 7) as in Table 12.

TABLE 12

| ch#1 | ch#2 | ch#3 | ch#4 | ch#5 | ch#6 |
|------|------|------|------|------|------|
| —    | x    | x    | x    | x    | —    |

That is, the eighth value may be a value for a channel pattern formed based on the second to fifth channels (ch#2 to ch#5).

When a ninth value is set as a value for the channel bandwidth for the control mode PPDU, a channel bandwidth (i.e., 8.64 GHz or 4.32 GHz+4.32 GHz) formed based on fourth channels among the first to sixth channels (i.e., ch#1 to ch#6) may be construed as a bandwidth according to the channel bonding scheme or the channel aggregation scheme.

For example, the ninth value may be a value (11000, i.e., 24) indicated based on the five bits (B0 to B4). In another example, the ninth value may be set to 24 minus 1, which is 23.

When the ninth value is set as the value for the channel bandwidth for the control mode PPDU, the channel bonding scheme or the channel aggregation scheme may be applied to the fourth channels among the first to sixth channels (i.e., ch#1 to ch#6 in FIG. 7) as in Table 13.

TABLE 13

| ch#1 | ch#2 | ch#3 | ch#4 | ch#5 | ch#6 |
|------|------|------|------|------|------|
| —    | —    | x    | x    | x    | x    |

That is, the ninth value may be a value for a channel pattern formed based on the third to sixth channels (ch#3 to ch#6).

When a tenth value is set as a value for the channel bandwidth for the control mode PPDU, a channel bandwidth (i.e., 2.16 GHz+2.16 GHz) formed based on two channels among the first to sixth channels (i.e., ch#1 to ch#6) may be construed as a bandwidth according to the channel aggregation scheme.

For example, the tenth value may be a value (11001, i.e., 25) indicated based on the five bits (B0 to B4). In another example, the tenth value may be set to 25 minus 1, which is 24.

When the tenth value is set as the value for the channel bandwidth for the control mode PPDU, the channel aggregation scheme may be applied to the two channels among the first to sixth channels (i.e., ch#1 to ch#6 in FIG. 7) as in Table 14.

TABLE 14

| ch#1 | ch#2 | ch#3 | ch#4 | ch#5 | ch#6 |
|------|------|------|------|------|------|
| x    | —    | x    | —    | —    | —    |
| —    | —    | —    | x    | —    | x    |

That is, the tenth value may be a value for a first channel pattern formed based on the first and third channels (ch#1 and ch#3) and a second channel pattern formed based on the fourth and sixth channels (ch#4 and ch#6).

For example, the second wireless terminal may determine one of the first channel pattern and the second channel pattern as a channel bandwidth for the control mode PPDU based on a channel via which the legacy part of the control mode PPDU is transmitted by the first wireless terminal.

When an eleventh value is set as a value for the channel bandwidth for the control mode PPDU, a channel bandwidth (i.e., 2.16 GHz+2.16 GHz) formed based on two channels among the first to sixth channels (i.e., ch#1 to ch#6) may be construed as a bandwidth according to the channel aggregation scheme.

For example, the eleventh value may be a value (11010, i.e., 26) indicated based on the five bits (B0 to B4). In another example, the eleventh value may be set to 26 minus 1, which is 25.

When the eleventh value is set as the value for the channel bandwidth for the control mode PPDU, the channel aggregation scheme may be applied to the two channels among the first to sixth channels (i.e., ch#1 to ch#6 in FIG. 7) as in Table 15.

TABLE 15

| ch#1 | ch#2 | ch#3 | ch#4 | ch#5 | ch#6 |
|------|------|------|------|------|------|
| —    | x    | —    | x    | —    | —    |
| —    | —    | x    | —    | x    | —    |

That is, the eleventh value may be a value for a first channel pattern formed based on the second and fourth channels (ch#2 and ch#4) and a second channel pattern formed based on the third and fifth channels (ch#3 and ch#5).

For example, the second wireless terminal may determine one of the first channel pattern and the second channel pattern as a channel bandwidth for the control mode PPDU based on a channel via which the legacy part of the control mode PPDU is transmitted by the first wireless terminal.

When a twelfth value is set as a value for the channel bandwidth for the control mode PPDU, a channel bandwidth (i.e., 2.16 GHz+2.16 GHz) formed based on two channels among the first to sixth channels (i.e., ch#1 to ch#6) may be construed as a bandwidth according to the channel aggregation scheme.

For example, the twelfth value may be a value (11011, i.e., 27) indicated based on the five bits (B0 to B4). In another example, the twelfth value may be set to 27 minus 1, which is 26.

When the twelfth value is set as the value for the channel bandwidth for the control mode PPDU, the channel aggregation scheme may be applied to the two channels among the first to sixth channels (i.e., ch#1 to ch#6 in FIG. 7) as in Table 16.

TABLE 16

| ch#1 | ch#2 | ch#3 | ch#4 | ch#5 | ch#6 |
|------|------|------|------|------|------|
| x    | —    | —    | x    | —    | —    |
| —    | x    | —    | —    | x    | —    |
| —    | —    | x    | —    | —    | x    |

That is, the twelfth value may be a value for a first channel pattern formed based on the first and fourth channels (ch#1 and ch#4), a second channel pattern formed based on the second and fifth channels (ch#2 and ch#5), and a third channel pattern formed based on the third and sixth channels (ch#3 and ch#6).

For example, the second wireless terminal may determine one of the first channel pattern to the third channel pattern as a channel bandwidth for the control mode PPDU based on a channel via which the legacy part of the control mode PPDU is transmitted by the first wireless terminal.

When a thirteenth value is set as a value for the channel bandwidth for the control mode PPDU, a channel bandwidth (i.e., 2.16 GHz+2.16 GHz) formed based on two channels among the first to sixth channels (i.e., ch#1 to ch#6) may be construed as a bandwidth according to the channel aggregation scheme.

For example, the thirteenth value may be a value (11100, i.e., 28) indicated based on the five bits (B0 to B4). In another example, the thirteenth value may be set to 28 minus 1, which is 27.

When the thirteenth value is set as the value for the channel bandwidth for the control mode PPDU, the channel aggregation scheme may be applied to the two channels among the first to sixth channels (i.e., ch#1 to ch#6 in FIG. 7) as in Table 17.

TABLE 17

| ch#1 | ch#2 | ch#3 | ch#4 | ch#5 | ch#6 |
|------|------|------|------|------|------|
| x    | —    | —    | —    | x    | —    |
| —    | x    | —    | —    | —    | x    |

That is, the thirteenth value may be a value for a first channel pattern formed based on the first and fifth channels (ch#1 and ch#5) and a second channel pattern formed based on the second and sixth channels (ch#2 and ch#6).

For example, the second wireless terminal may determine one of the first channel pattern and the second channel pattern as a channel bandwidth for the control mode PPDU based on a channel via which the legacy part of the control mode PPDU is transmitted by the first wireless terminal.

When a fourteenth value is set as a value for the channel bandwidth for the control mode PPDU, a channel bandwidth (i.e., 4.32 GHz+4.32 GHz) formed based on fourth channels among the first to sixth channels (i.e., ch#1 to ch#6) may be construed as a bandwidth according to the channel bonding scheme and the channel aggregation scheme.

For example, the fourteenth value may be a value (11110, i.e., 30) indicated based on the five bits (B0 to B4). In another example, the fourteenth value may be set to 30 minus 1, which is 29.

When the fourteenth value is set as the value for the channel bandwidth for the control mode PPDU, the channel bonding scheme and the channel aggregation scheme may be applied to the fourth channels among the first to sixth channels (i.e., ch#1 to ch#6 in FIG. 7) as in Table 18.

TABLE 18

| ch#1 | ch#2 | ch#3 | ch#4 | ch#5 | ch#6 |
|------|------|------|------|------|------|
| x    | X    | —    | x    | x    | —    |

That is, the fourteenth value may be a value for a channel pattern formed based on the first, second, fourth, and fifth channels (ch#1, ch#2, ch#4, and ch#5).

When a fifteenth value is set as a value for the channel bandwidth for the control mode PPDU, a channel bandwidth (i.e., 4.32 GHz+4.32 GHz) formed based on fourth channels among the first to sixth channels (i.e., ch#1 to ch#6) may be construed as a bandwidth according to the channel bonding scheme and the channel aggregation scheme.

For example, the fifteenth value may be a value (11111, i.e., 31) indicated based on the five bits (B0 to B4). In another example, the fifteenth value may be set to 31 minus 1, which is 30.

When the fifteenth value is set as the value for the channel bandwidth for the control mode PPDU, the channel bonding scheme and the channel aggregation scheme may be applied to the fourth channels among the first to sixth channels (i.e., ch#1 to ch#6 in FIG. 7) as in Table 19.

TABLE 19

| ch#1 | ch#2 | ch#3 | ch#4 | ch#5 | ch#6 |
|------|------|------|------|------|------|
| —    | X    | x    | —    | x    | x    |

That is, the fifteenth value may be a value for a channel pattern formed based on the second, third, fifth, and sixth channels (ch#2, ch#3, ch#5, and ch#6).

When a sixteenth value is set as a value for the channel bandwidth for the control mode PPDU, a channel bandwidth (i.e., 4.32 GHz+4.32 GHz) formed based on fourth channels among the first to sixth channels (i.e., ch#1 to ch#6) may be construed as a bandwidth according to the channel bonding scheme and the channel aggregation scheme.

For example, the sixteenth value may be a value (11111, i.e., 31) indicated based on the five bits (B0 to B4). In another example, the sixteenth value may be set to 31 minus 1, which is 30.

When the sixteenth value is set as the value for the channel bandwidth for the control mode PPDU, the channel bonding scheme and the channel aggregation scheme may be applied to the fourth channels among the first to sixth channels (i.e., ch#1 to ch#6 in FIG. 7) as in Table 20.

TABLE 20

| ch#1 | ch#2 | ch#3 | ch#4 | ch#5 | ch#6 |
|------|------|------|------|------|------|
| X    | X    | —    | —    | x    | x    |

That is, the sixteenth value may be a value for a channel pattern formed based on the first, second, fifth, and sixth channels (ch#1, ch#2, ch#5, and ch#6).

According to the embodiment of FIG. 9, the first to sixth channels (ch#1 to ch#6) may be channels allowed in advance for the second wireless terminal through a beacon frame periodically transmitted by the first wireless terminal.

In another example, the first wireless terminal may not allow some of the first to sixth channels for the second wireless terminal through the beacon frame depending on the operating environment of the WLAN system.

The beacon frame periodically transmitted by the first wireless terminal may include information on whether the channel bonding scheme, the channel aggregation scheme, or the two schemes are allowed for the second wireless terminal.

Also, the beacon frame periodically transmitted by the first wireless terminal may include information on the primary channel allowed in advance for the second wireless terminal.

In step S920, the first wireless terminal may transmit the control mode PPDU based on the channel bandwidth.

For example, the non-EDMG portion in FIG. 8 (e.g., 810 to 830 in FIG. 8) of the control mode PPDU, which includes information on the channel bandwidth signaled in step S910 of the control mode PPDUs, may be transmitted over a single channel.

In another example, the non-EDMG portion in FIG. 8 (e.g., 810 to 830 in FIG. 8) of the control mode PPDU, which includes information on the channel bandwidth signaled in step S910 of the control mode PPDUs, may be duplicated and transmitted over a plurality of channels (e.g., ch#1 to ch#6 in FIG. 7).

For example, the EDMG portion in FIG. 8 (e.g., 840 to 890 in FIG. 8) of the control mode PPDU may be transmitted according to the channel bandwidth signaled in step S910. For example, the predetermined primary channel for the second wireless terminal may be included in the channel bandwidth over which the control mode PPDU is transmitted.

Steps S910 and S920 may be understood as follows from the viewpoint of the second wireless terminal as a reception terminal.

The second wireless terminal may receive the non-EDMG portion in FIG. 8 (e.g., 810 to 830 in FIG. 8) through the predetermined primary channel Subsequently, the second wireless terminal may decode the non-EDMG portion in FIG. 8 (e.g., 810 to 830 in FIG. 8) received through the predetermined primary channel. Accordingly, the second wireless terminal may obtain channel bandwidth information for the EDMG portion in FIG. 8 (e.g., 840 to 890 in FIG. 8), which is the remaining portion of the control mode PPDU.

The channel bandwidth information may indicate a plurality of channel patterns. In this case, the second wireless terminal may determine a channel bandwidth for the EDMG portion in FIG. 8 (e.g., 840 to 890 in FIG. 8) among the plurality of channel patterns in view of the channel bandwidth information and the position of the predetermined primary channel on the frequency.

That is, the second wireless terminal may receive the EDMG portion in FIG. 8 (e.g., 840 to 890 in FIG. 8) based on the channel bandwidth information received in step S910.

Figure 10:
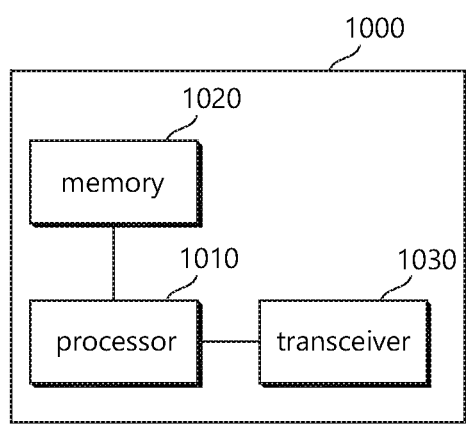
FIG. 10 is a block diagram illustrating a wireless device to which the embodiments are applicable.

FIG. 10 is a block diagram illustrating a wireless device to which the embodiments are applicable.

Referring to FIG. 10, the wireless device may be an STA capable of implementing the foregoing embodiments, which may be an AP or a non-AP STA. Further, the wireless device may correspond to the foregoing user or a transmitting terminal that transmits a signal to a user.

As illustrated in FIG. 10, the wireless device includes a processor 1010, a memory 1020, and a transceiver 1030. The processor 1010, the memory 1020, and the transceiver 1030 may be configured as separate chips or as a single chip having at least two blocks/functions.

The transceiver 1030 may be a device including a transmitter and a receiver. When a particular operation is performed only any one of the transmitter and the receiver may operate or both the transmitter and the receiver may operate.

The transceiver 1030 may include one or more antennas for transmitting and/or receiving a radio signal. Further, the transceiver 1030 may include an amplifier for amplifying a reception signal and/or a transmission signal and a band-pass filter for transmission on a particular frequency band.

The processor 1010 may implement the functions, processes, and/or methods proposed in the present specification. For example, the processor 1010 may perform operations according to the aforementioned embodiments. That is, the processor 1010 may perform operations disclosed in the embodiments of FIG. 1 to FIG. 9.

The processor 1010 may include an application-specific integrated circuit (ASIC), other chipsets, a logic circuit, a data processor, and/or a converter to convert a baseband signal and a radio signal from one to the other.

The memory 1020 may include a read-only memory (ROM), a random access memory (RAM), a flash memory, a memory card, a storage medium, and/or other storage devices.

Figure 11:
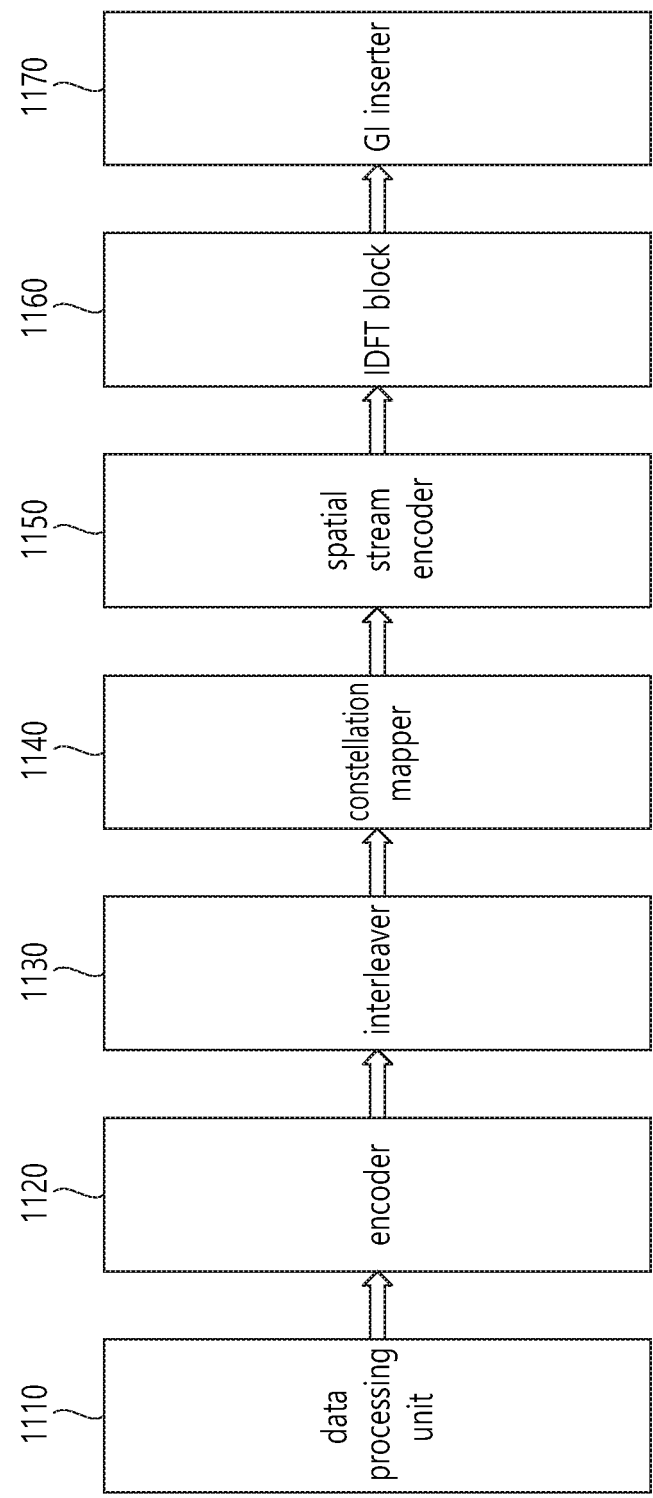
FIG. 11 is a block diagram illustrating an example of a device included in a processor.

FIG. 11 is a block diagram illustrating an example of a device included in a processor.

Although the example illustrated in FIG. 11 is described with reference to blocks for a transmission signal for convenience of description, it is obvious that the same blocks may be used to process a reception signal.

A data processing unit 1110 generates transmission data (control data and/or user data) corresponding to a transmission signal. An output from the data processing unit 1110 may be input to an encoder 1120. The encoder 1120 may perform coding using a binary convolutional code (BCC) or a low-density parity-check (LDPC) technique. At least one encoder 1120 may be included, and the number of encoders 1120 may be determined depending on various pieces of information (e.g., the number of data streams).

An output from the encoder 1120 may be input to an interleaver 1130. The interleaver 1130 performs an operation of distributing consecutive bit signals on radio resources (e.g., time and/or frequency) in order to prevent burst errors due to fading. At least one interleaver 1130 may be included, and the number of interleavers 1130 may be determined depending on various pieces information (e.g., the number of spatial streams).

An output from the interleaver 1130 may be input to a constellation mapper 1140. The constellation mapper 1140 performs constellation mapping, such as biphase shift keying (BPSK), quadrature phase shift keying (QPSK), and n-quadrature amplitude modulation (n-QAM).

An output from the constellation mapper 1140 may be input to a spatial stream encoder 1150. The spatial stream encoder 1150 performs data processing to transmit a transmission signal through at least one spatial stream. For example, the spatial stream encoder 1150 may perform at least one of space-time block coding (STBC), cyclic shift diversity (CSD) insertion, and spatial mapping on a transmission signal.

An output from the spatial stream encoder 1150 may be input to a IDFT block 1160. The IDFT block 1160 performs inverse discrete Fourier transform (IDFT) or inverse fast Fourier transform (IFFT).

An output from the IDFT block 1160 is input to a guard interval (GI) inserter 1170, and an output from the GI inserter 1170 is input to the transceiver 2130 of FIG. 10.

Although embodiments of the invention have been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method for communicating in a wireless local area network (WLAN) system, the method comprising:
    configuring, by a first wireless terminal, a control header including a scrambler initialization field related to initializing a scrambler of the first wireless terminal and a control field which is a separate field from the scrambler initialization field,
    wherein the control field is a turnaround field related to whether the first wireless terminal is required to listen for an incoming physical protocol data unit (PPDU) immediately following a current transmission of the first wireless terminal,
    wherein the scrambler initialization field has a length of 4 bits, the turnaround field has a length of 1 bit;
    configuring, by the first wireless terminal, a control mode PPDU comprising the control header, wherein a value of the scrambler initialization field and a value of the turnaround field are determined by the first wireless terminal based on at least one 2.16 GHz channel used for the control mode PPDU, wherein the at least one 2.16 GHz channel is selected among a plurality of 2.16 GHz channels sequentially arranged on a frequency domain; and transmitting, by the first wireless terminal, the control mode PPDU to a second wireless terminal based on the at least one 2.16 GHz channel.

2. The method of claim 1, wherein the control header further includes a packet type field related to the control mode PPDU, and the packet type field has a length of 1 bit.

3. The method of claim 1, wherein the value of the scrambler initialization field and the value of the turnaround field are determined further based on a total bandwidth of the at least one 2.16 GHz channel.

4. The method of claim 1, wherein the control mode PPDU comprises a Request to Send (RTS) frame, a directional multi-gigabit Clear to Send (DMG CTS) frame, or a directional multi-gigabit Clear to Send Denial to Send (DMG DTS) frame.

5. A first wireless terminal in a wireless local area network (WLAN) system, comprising:

a transceiver configured to transmit a radio signal; and
a processor configured to control the transceiver,
wherein the processor is further configured to:
configure a control header including a scrambler initialization field related to initializing a scrambler of the first wireless terminal and a control field which is a separate field from the scrambler initialization field,
wherein the control field is a turnaround field related to whether the first wireless terminal is required to listen for an incoming physical protocol data unit (PPDU) immediately following a current transmission of the first wireless terminal,
wherein the scrambler initialization field has a length of 4 bits, the turnaround field has a length of 1 bit;
configure a control mode PPDU comprising the control header,
wherein a value of the scrambler initialization field and a value of the turnaround field are determined by the first wireless terminal based on at least one 2.16 GHz channel used for the control mode PPDU,
wherein the at least one 2.16 GHz channel is selected among a plurality of 2.16 GHz channels sequentially arranged on a frequency domain; and
transmit the control mode PPDU to a second wireless terminal based on the at least one 2.16 GHz channel.

6. The first wireless terminal of claim 5, wherein the control header further includes a packet type field related to the control mode PPDU, and the packet type field has a length of 1 bit.

7. The first wireless terminal of claim 5, wherein the value of the scrambler initialization field and the value of the turnaround field are determined further based on a total bandwidth of the at least one 2.16 GHz channel.

8. The first wireless terminal of claim 5, wherein the control mode PPDU comprises a Request to Send (RTS) frame, a directional multi-gigabit Clear to Send (DMG CTS) frame, or a directional multi-gigabit Clear to Send Denial to Send (DMG DTS) frame.

9. A first wireless terminal in a wireless local area network (WLAN) system, comprising:

a transceiver configured to receive a radio signal; and
a processor configured to control the transceiver,
wherein the processor is further configured to:
receive a control mode physical protocol data unit (PPDU) comprising a control header based on at least one 2.16 GHz channel from a second wireless terminal,
wherein the control header includes a scrambler initialization field related to initializing a scrambler of the second wireless terminal and a control field which is a separate field from the scrambler initialization field,
wherein the control field is a turnaround field related to whether the first wireless terminal is required to listen for an incoming PPDU immediately following a current transmission of the first wireless terminal,
wherein the scrambler initialization field has a length of 4 bits, the turnaround field has a length of 1 bit;
wherein a value of the scrambler initialization field and a value of the turnaround field are determined based on the at least one 2.16 GHz channel,
wherein the at least one 2.16 GHz channel is selected among a plurality of 2.16 GHz channels sequentially arranged on a frequency domain; and
decode the control mode PPDU based on the control header.

10. The first wireless terminal of claim 9, wherein the control header further includes a packet type field related to the control mode PPDU, and the packet type field has a length of 1 bit.

11. The first wireless terminal of claim 9, wherein the value of the scrambler initialization field and the value of the turnaround field are determined further based on total a bandwidth of the at least one 2.16 GHz channel.

12. The first wireless terminal of claim 9, wherein the control mode PPDU comprises a Request to Send (RTS) frame, a directional multi-gigabit Clear to Send (DMG CTS) frame, or a directional multi-gigabit Clear to Send Denial to Send (DMG DTS) frame.

* * * * *